(12) United States Patent  (10) Patent No.: US 9,158,808 B2
Ishikawa  (45) Date of Patent: Oct. 13, 2015

(54) OBJECT ARRANGEMENT APPARATUS FOR DETERMINING OBJECT DESTINATION, OBJECT ARRANGING METHOD, AND COMPUTER PROGRAM THEREOF

(75) Inventor: Kenichiro Ishikawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 83 days.

(21) Appl. No.: 13/810,257

(22) PCT Filed: Jul. 15, 2011

(86) PCT No.: PCT/JP2011/066775
§ 371 (c)(1),
(2), (4) Date: Jan. 15, 2013

(87) PCT Pub. No.: WO2012/023384
PCT Pub. Date: Feb. 23, 2012

(65) Prior Publication Data
US 2013/0117264 A1  May 9, 2013

(30) Foreign Application Priority Data

Aug. 19, 2010 (JP) ................................ 2010-184109

(51) Int. Cl.
*G06F 17/30* (2006.01)
*G06F 3/06* (2006.01)

(52) U.S. Cl.
CPC ........ *G06F 17/30386* (2013.01); *G06F 3/0607* (2013.01); *G06F 3/0643* (2013.01); *G06F 3/0689* (2013.01)

(58) Field of Classification Search
None
See application file for complete search history.

(56) References Cited

U.S. PATENT DOCUMENTS 5,987,462 A   11/1999  Kasao et al.
6,169,982 B1   1/2001  Kasao et al.

(Continued)

FOREIGN PATENT DOCUMENTS

CN  1629823 A   6/2005
CN  101794286 A   8/2010

(Continued)

OTHER PUBLICATIONS

The international search report for PCT/JP2011/066775 mailed on, Aug. 30, 2011.

(Continued)

*Primary Examiner* — Debbie Le
(74) *Attorney, Agent, or Firm* — Sughrue Mion, PLLC

(57) ABSTRACT

Disclosed is an object arrangement apparatus which arranges a plurality of objects approximately uniformly to a plurality of arrangement destinations by a comparatively easy processing configuration. This object arrangement apparatus includes an arrangement destination determination means. The arrangement destination determination means refers to sequence information generated based on unique information for objects and refers to corresponding information between arrangement destination identifiers identifying arrangement destinations of the objects and second numbers associated with the arrangement destination identifiers. The arrangement destination determination means generates first numbers by using the sequence information, the first numbers not having a correlation therebetween when the first numbers are generated with different sequence information, and repeats generating a new first number until the first number matches the second number contained in the corresponding information. The arrangement destination determination means determines, when the first number matches any of the second numbers, to arrange the object to an arrangement destination corresponding to the arrangement destination identifier related to the matched second number.

22 Claims, 18 Drawing Sheets

(56) References Cited

U.S. PATENT DOCUMENTS

| | | |
|---|---|---|
| 6,584,457 B1 | 6/2003 | Kasao et al. |
| 7,587,426 B2 * | 9/2009 | Fujiwara et al. ............... 1/1 |
| 8,196,208 B2 * | 6/2012 | Kim et al. ................ 726/26 |
| 8,595,273 B2 * | 11/2013 | Brandle ................ 708/250 |
| 8,638,930 B2 * | 1/2014 | Saito ...................... 380/46 |
| 2001/0047367 A1 | 11/2001 | Eda et al. |
| 2003/0140051 A1 | 7/2003 | Fujiwara et al. |
| 2003/0195893 A1 | 10/2003 | Kasao et al. |
| 2005/0144172 A1 | 6/2005 | Kilian et al. |
| 2006/0008083 A1 * | 1/2006 | Saito ...................... 380/28 |
| 2007/0266441 A1 | 11/2007 | Kim et al. |
| 2008/0177812 A1 | 7/2008 | Brandle |
| 2011/0268274 A1 * | 11/2011 | Qiu et al. .............. 380/270 |

FOREIGN PATENT DOCUMENTS

| | | |
|---|---|---|
| DE | 102004056701 A1 | 7/2005 |
| GB | 2409071 A | 6/2005 |
| JP | H09-293006 A | 11/1997 |
| JP | H09293006 A | 11/1997 |
| JP | 2003216474 A | 7/2003 |
| JP | 2005235171 A | 9/2005 |
| JP | 2008181358 A | 8/2008 |
| JP | 2009134733 A | 6/2009 |

OTHER PUBLICATIONS

"Consistent hashing and random trees: distributed caching protocols for relieving hot spots on the World Wide Web", David Karger, Eric Lehman, Tom Leighton, Matthew Levine, Daniel Lewin, Rina Panigrahy, 1997.

English translation of Office Action for CN Application No. 2011800-401656, dated on Dec 24, 2014.

Japenese Office Action for JP Application No. 2012-529533 mailed on Feb. 17, 2015 with English Translation.

* cited by examiner

Fig. 6

| OBJECT DATA | FIRST TIME | | SECOND TIME | | THIRD TIME | | OUTPUT OF STORAGE DECISION FUNCTION |
|---|---|---|---|---|---|---|---|
| | RANDOM NUMBER OUTPUT VALUE | DECISION RESULT | RANDOM NUMBER OUTPUT VALUE | DECISION RESULT | RANDOM NUMBER OUTPUT VALUE | DECISION RESULT | |
| DATA0 | 0 | OK | 15 | NOP | 7 | NOP | 0 |
| DATA1 | 12 | OK | 13 | NOP | 18 | NOP | 12 |
| DATA2 | 14 | OK | 10 | NOP | 19 | NOP | 14 |
| DATA3 | 3 | OK | 10 | NOP | 2 | NOP | 3 |
| DATA4 | 8 | OK | 11 | NOP | 4 | NOP | 8 |
| DATA5 | 11 | OK | 12 | NOP | 19 | NOP | 11 |
| DATA6 | 19 | NG | 5 | OK | 2 | NOP | 5 |
| DATA7 | 17 | NG | 12 | OK | 15 | NOP | 12 |
| DATA8 | 16 | NG | 18 | NG | 13 | OK | 13 |
| DATA9 | 1 | OK | 1 | NOP | 6 | NOP | 1 |
| DATA10 | 2 | OK | 9 | NOP | 5 | NOP | 2 |
| DATA11 | 9 | OK | 6 | NOP | 4 | NOP | 9 |
| DATA12 | 7 | OK | 2 | NOP | 1 | NOP | 7 |
| DATA13 | 16 | NG | 18 | NG | 9 | OK | 9 |
| DATA14 | 10 | OK | 9 | NOP | 22 | NOP | 10 |
| DATA15 | 5 | OK | 6 | NOP | 7 | NOP | 5 |
| DATA16 | 6 | OK | 5 | NOP | 9 | NOP | 6 |

Fig. 7

| OBJECT DATA | FIRST TIME | | SECOND TIME | | THIRD TIME | | OUTPUT OF STORAGE DECISION FUNCTION |
|---|---|---|---|---|---|---|---|
| | RANDOM NUMBER OUTPUT VALUE | DECISION RESULT | RANDOM NUMBER OUTPUT VALUE | DECISION RESULT | RANDOM NUMBER OUTPUT VALUE | DECISION RESULT | |
| DATA0 | 0 | OK | 15 | NOP | 7 | NOP | 0 |
| DATA1 | 12 | OK | 13 | NOP | 18 | NOP | 12 |
| DATA2 | 14 | OK | 10 | NOP | 19 | NOP | 14 |
| DATA3 | 3 | OK | 10 | NOP | 2 | NOP | 3 |
| DATA4 | 8 | OK | 11 | NOP | 4 | NOP | 8 |
| DATA5 | 11 | OK | 12 | NOP | 19 | NOP | 11 |
| DATA6 | 19 | NG | 5 | OK | 2 | NOP | 5 |
| DATA7 | 17 | NG | 12 | OK | 15 | NOP | 12 |
| DATA8 | 15 | NG→OK | 18 | NG→NOP | 13 | OK→NOP | 13→15 |
| DATA9 | 1 | OK | 1 | NOP | 6 | NOP | 1 |
| DATA10 | 2 | OK | 9 | NOP | 5 | NOP | 2 |
| DATA11 | 9 | OK | 6 | NOP | 4 | NOP | 9 |
| DATA12 | 7 | OK | 2 | NOP | 1 | NOP | 7 |
| DATA13 | 15 | NG→OK | 18 | NG→NOP | 9 | OK→NOP | 9→15 |
| DATA14 | 10 | OK | 9 | NOP | 22 | NOP | 10 |
| DATA15 | 5 | OK | 6 | NOP | 7 | NOP | 5 |
| DATA16 | 6 | OK | 5 | NOP | 9 | NOP | 6 |

Fig. 9

| OBJECT DATA | FIRST TIME | | SECOND TIME | | THIRD TIME | | OUTPUT OF STORAGE DECISION FUNCTION |
|---|---|---|---|---|---|---|---|
| | RANDOM NUMBER OUTPUT VALUE | DECISION RESULT | RANDOM NUMBER OUTPUT VALUE | DECISION RESULT | RANDOM NUMBER OUTPUT VALUE | DECISION RESULT | |
| DATA0 | 0 | OK | 15 | NOP | 7 | NOP | 0 |
| DATA1 | 12 | OK→NG | 13 | NOP→OK | 18 | NOP | 12→13 |
| DATA2 | 14 | OK | 10 | NOP | 19 | NOP | 14 |
| DATA3 | 3 | OK | 10 | NOP | 2 | NOP | 3 |
| DATA4 | 8 | OK | 11 | NOP | 4 | NOP | 8 |
| DATA5 | 11 | OK | 12 | NOP | 19 | NOP | 11 |
| DATA6 | 19 | NG | 5 | OK | 2 | NOP | 5 |
| DATA7 | 17 | NG | 12 | OK→NG | 14 | NOP→OK | 12→14 |
| DATA8 | 16 | NG | 18 | NG | 13 | OK | 16 |
| DATA9 | 1 | OK | 1 | NOP | 6 | NOP | 1 |
| DATA10 | 2 | OK | 9 | NOP | 5 | NOP | 2 |
| DATA11 | 9 | OK | 6 | NOP | 4 | NOP | 9 |
| DATA12 | 7 | OK | 2 | NOP | 1 | NOP | 7 |
| DATA13 | 16 | NG | 18 | NG | 9 | OK | 16 |
| DATA14 | 10 | OK | 9 | NOP | 22 | NOP | 10 |
| DATA15 | 5 | OK | 6 | NOP | 7 | NOP | 5 |
| DATA16 | 6 | OK | 5 | NOP | 9 | NOP | 6 |

Fig. 10A

| NUMBER | STORAGE IDENTIFICATION INFORMATION |
|---|---|
| 0 | Storage ID=3 |
| 1 | Storage ID=2 |
| 2 | Storage ID=1 |
| 3 | Storage ID=5 |
| 4 | Storage ID=0 |
| 5 | Storage ID=4 |
| 6 | Storage ID=5 |
| 7 | Storage ID=6 |

Fig. 10B

| NUMBER | STORAGE IDENTIFICATION INFORMATION |
|---|---|
| 0 | Storage ID=3 |
| 1 | Storage ID=2 |
| 2 | Storage ID=1 |
| 3 | Storage ID=5 |
| 4 | Storage ID=5 |
| 5 | Storage ID=4 |
| 6 | Storage ID=6 |
| ⋮ | ⋮ |
| 14 | Storage ID=14 |
| 15 | Storage ID=12 |

OBJECT ARRANGEMENT APPARATUS FOR DETERMINING OBJECT DESTINATION, OBJECT ARRANGING METHOD, AND COMPUTER PROGRAM THEREOF

This application is a National Stage Entry of PCT/JP2011/066775 filed Jul. 15, 2011, which claims priority from Japanese Patent Application 2010-184109 filed Aug. 19, 2010, the contents of all of which are incorporated herein by reference, in their entirety.

TECHNICAL FIELD

The present invention relates to a technical field which arranges objects such as data and articles optimally to a desired arrangement destination (location destination).

BACKGROUND ART

The art is proposed that, when recording (storing) data as objects to be stored (hereinafter, referred to as "object data") in a plurality of storages, the object data is stored in each storage where the object data are nearly evenly (uniformly) distributed. According to such technology, by performing simultaneous access to the plurality of storages, an access performance to the object data improves. However, when the object data distributed and recorded in the plurality of storages is accessed, a method to examine the storages recording the object data is a problem.

As methods to examine the storages recording the object data, the following two methods are considered.

The first method is the method to examine the storages recording the object data by holding a corresponding relationship between the object data and the storage in a table, and referring to the table during data access.

In the second method, first, a corresponding relationship between the object data and the storage is determined by using a specified algorithm based on information specific to the object data (hereinafter, referred to as "metadata"). And in the second method, during data access, by inputting the metadata to the algorithm, a storage which records target object data is examined.

In the first method (method using a table reference) mentioned above, all equipment having a possibility that the corresponding relationship between the object data and the storage is examined has to store the table which holds the corresponding relationship therebetween.

On the other hand, in order to determine the storage which should record the object data by the algorithm, the second method (method using algorithm) mentioned above does not need to store the table which holds a corresponding relationship between the object data and the storage. However, in the second method, the algorithm for recording the object data in the each storage is needed in state of sufficient distribution thereof so that performance improvement of simultaneous access to a plurality of storages may be demonstrated sufficiently during data access. In the second method, when storage number may fluctuate, it needs the algorithm which calculates correspondence of the object data and the storage corresponding to the fluctuation of the storage number. As a related art which discloses the second method, there are a patent literature 1 (Japanese Patent Application Laid-Open No. 2003-216474) and a patent literature 2 (Japanese Patent Application Laid-Open No. 2008-181358).

FIG. 18 is a chart which explains the related art which exists before the present application was filed. As an example of a system to determine correspondence of known data and storage based on metadata, a system 600 is shown in FIG. 18. The system 600 determines the storage which records object data using the metadata.

That is, in the system 600, by performing a hash operation based on a metadata 611 among object data and the metadata (610), a hash operational function 601 gets a hash 612. The metadata 611 is an identifier which was given in order to specify the object data, and is information such as an address, an object name, a directory-name or a file name.

Next, by performing modular arithmetic based on the hash 612 and connection storage information 613, the modular operational function 602 gets a result 614 of the modular arithmetic. Here, connection storage information 613 is information which is needed when data of a network address of storage is stored in a storage. The modular operational function 602 obtains the number of storage from the connection storage information 613 and performs the modular arithmetic to the hash 612 by the number of storage. As a result, the modular operational function 602 obtains a modular arithmetic result 614. And a number-storage corresponding determination function 603 determines a storage 620 which records the object data 610 based on the modular arithmetic operation result 614 and outputs storage information 615 related to the determined storage 620.

As mentioned above, when object data is arranged in a plurality of storages, a storage determination method disclosed by the patent literature 1 can be applied. According to this method, the storage can be determined by calculation. That is, according to the method thereof, the object data can be distributed and recorded to a plurality of storages without using a table which holds a corresponding relationship between the object data and the storage. According to the method thereof, by changing the divisor in the modular arithmetic, it is possible to correspond to the change in the number of storage.

As a related art which exists before the present application was filed, for example, there is non-patent literature 1. When storage fluctuates from the state that object data was distributionally arranged to a plurality of storages, an art which suppresses movement of each object data in a minimum is proposed.

CITATION LIST

Patent Literature

[Patent literature 1] Japanese Patent Application Laid-Open No. 2003-216474
[Patent literature 2] Japanese Patent Application Laid-Open No. 2008-181358

Non-Patent Literature

[Non-patent literature 1] "Consistent hashing and random trees: distributed caching protocols for relieving hot spots on the World Wide Web", David Karger, Eric Lehman, Tom Leighton, Matthew Levine, Daniel Lewin, Rina Panigrahy, 1997

SUMMARY OF INVENTION

Technical Problems

By the way, when the storages fluctuate in the method illustrated by the patent literature 1, the divisor number in the modular arithmetic is changed. According to this, in a method described in the patent literature 1, because a result of the modular arithmetic of lots of object data changes, as a result, the storage which should record these object data is changed. For this reason, in the method described in the patent literature 1, when storage fluctuates, it needs movement of a great deal of object data.

In contrast, according to a method described in the non-patent literature 1, when storage fluctuates, an effect that suppresses movement of each object data in a minimum is obtained. However, in case of the technology proposed in the non-patent literature 1, in order to enjoy the effect, arranging object data nearly evenly (uniformly) in a plurality of storages, memory resources (hardware resources) required to processing will be a large capacity so that target storages increase. For this reason, when assuming a system processing enormous storage like a large-scale data center is intended, for example, increase of memory resource required to processing and increase of processing time are problems for the technology according to the non-patent literature 1.

Accordingly, a main object of the present invention is to provide an object arrangement apparatus which arranges a plurality of objects approximately uniformly to a plurality of arrangement destinations by a comparatively easy processing configuration, a method therefore and a computer program.

Solution to Problems

In order to achieve the above-mentioned object, the object arrangement apparatus according to the present invention is characterized by including the following configuration.

That is, an object arrangement apparatus according to the present invention is characterized by including arrangement destination determination means, wherein the arrangement destination determination means refers to sequence information generated based on unique information for objects and refers to corresponding information between arrangement destination identifiers identifying arrangement destinations of the objects and second numbers associated with the arrangement destination identifiers, the arrangement destination determination means generates first numbers by using the sequence information, the first numbers not having a correlation therebetween when the first numbers are generated with different sequence information, and repeats generating a new first number until the first number matches the second number contained in the corresponding information, and the arrangement destination determination means determines, when the first number matches any of the second numbers, to arrange the object to an arrangement destination corresponding to the arrangement destination identifier related to the matched second number.

And, for example, the arrangement destination determination means may include:

number creating means for being capable of generating the first number repeatedly; and decision means for comparing the second number and the first number with reference to the corresponding information and for determining, in response to a coincidence of those numbers, an arrangement destination corresponding to the arrangement destination identifier associated with the second number as an arrangement destination of the object.

In the above-mentioned case, the number creating means may include a plurality of number creating means having mutually different ranges of numbers generable as the first numbers therebetween and having a relation that the range of numbers by one of the number creating means with a range number n (n: a natural number) is included in a range of numbers by other of the number creating means with a range number (n+1), and by the decision means:

(I) a biggest range number is set to p and a big range number to the next thereof is set to q, (II) the first number is compared with the second number when the first number that the number creating means with the range number p generated exceeds the range by the number creating means with the range number q, an arrangement destination corresponding to the arrangement destination identifier related to the second number is determined as an arrangement destination of the object when those numbers are identical, and, when those numbers are not identical, generating of the new first number, the (I) and (II) are repeated, and (III) when the first number that the number creating means with range number p generated is within the range by the number creating means with the range number q, one is subtracted from p and q, respectively, and as a result of the subtraction, the (II) is repeated when q is not 0, and the first number that the number creating means with the range number 1 generated is compared with the second number when q is 0, and the arrangement destination corresponding to the arrangement destination corresponding to the arrangement destination identifier related to the second number is determined as an arrangement destination of the object when those numbers are identical, and not identical, the first number is generated and the processing is redone from the (I).

The object arranging method according to the present invention in order to achieve the above-mentioned object is characterized by including the following configuration.

That is, an object arranging method according to the present invention is characterized by including:

referring to sequence information generated based on unique information for objects, and referring to corresponding information between arrangement destination identifiers for identifying the arrangement destinations of the objects and second numbers associated with the arrangement destination identifiers;

generating first numbers by using the sequence information, the first numbers not having a correlation therebetween when the first numbers are generated with different sequence information;

generating a new first number repeatedly until the first number matches the second number contained in the corresponding information; and determining, when the first number matches any of the second numbers, to arrange the object to an arrangement destination corresponding to the arrangement destination identifier related to the matched second number.

In the above-mentioned case, the object arranging method may includes:

by using a plurality of number creating means, which generate the first numbers, having mutually different ranges of the numbers generable as the first numbers therebetween and having a relation that the range of numbers according to one of the number creating means with a range number n (n: a natural number) is included in a range of numbers according to other of the number creating means with a range number (n+1), wherein (I) a biggest range number is set to p and set a range number big next to q;

(II) the first number and the second number are compared when the first number that the number creating means with the range number p generated exceeds the range according to the number creating means with the range number q, an arrangement destination corresponding to the arrangement destination identifier related to the second number is determined as an arrangement destination of the object when those numbers are identical and, when those numbers are not identical, generating of the new first number, the (I) and (II) are repeated; and (III) when the first number that the number creating means with range number p generated is within the range by the number creating means with the range number q, one is subtracted from p and q, respectively, and as a result of the subtraction, the (II) is repeated when q is not 0, and the first number that the number creating means with the range number 1 generated is compared with the second number when q is 0, and the arrangement destination corresponding to the arrangement destination corresponding to the arrangement destination identifier related to the second number is determined as an arrangement destination of the object when those numbers are identical, and not identical, the first number is generated and the processing is redone from the (I).

Further, the object is also achieved by a computer program and a non-transitory computer-readable storage media storing the computer program which realizes the object arrangement apparatus having aforementioned configuration.

Advantageous Effects of Invention

According to the present invention, the object arrangement apparatus which arranges a plurality of objects approximately uniformly to a plurality of arrangement destinations by easy processing configuration relatively, the method therefore and a computer program can be provided.

BRIEF DESCRIPTION OF DRAWINGS

FIG. 6 is a chart explaining an arrangement operation of the object data according to the object data arrangement apparatus according to the first exemplary embodiment of the present invention.

FIG. 7 is a chart explaining an operation of the object data arrangement apparatus according to the first exemplary embodiment of the present invention when adding a storage from the arrangement state shown in FIG. 6.

FIG. 9 is a chart explaining an operation of the object data arrangement apparatus according to the first exemplary embodiment of the present invention when decreasing storages from the arrangement state shown in FIG. 6.

FIG. 10A is a chart illustrating conceptually a number-storage conversion table referred by the object data arrangement apparatus according to the first exemplary embodiment of the present invention.

FIG. 10B is a chart illustrating conceptually a number-storage conversion table referred by the object data arrangement apparatus according to the first exemplary embodiment of the present invention.

DESCRIPTION OF EMBODIMENTS

Next, an exemplary embodiment of the present invention is explained in detail with reference to drawings. The exemplary embodiment described below does not limit the present invention relating to the range of the claims. And, not all of combination of configurations described in the following exemplary embodiment may be necessarily indispensable in the configuration of the present invention.

Figure 1:
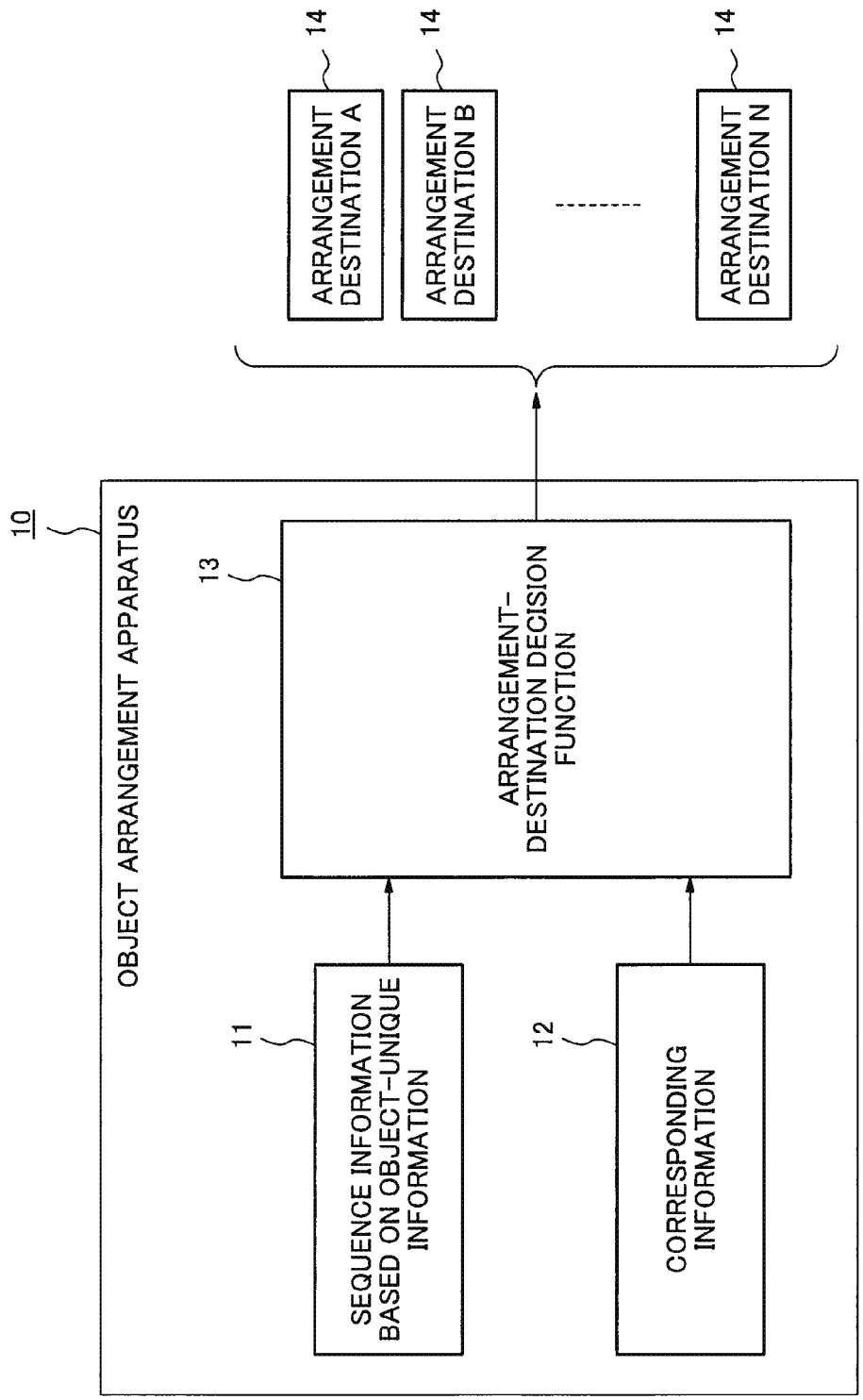
FIG. 1 is a block diagram showing a configuration of an object arrangement apparatus according to an exemplary embodiment of the present invention.

FIG. 1 is a block diagram showing a configuration of an object arrangement apparatus according to an exemplary embodiment of the present invention and it shows a concept common to each embodiment and its modification which are explained below.

In FIG. 1, an object arrangement apparatus 10 is provided with an arrangement destination decision function 13. The arrangement destination decision function 13 is an apparatus which determines so as to arrange a plurality of objects (not shown) approximately uniformly to a plurality of arrangement destinations (A, B, . . . , n) 14. The arrangement destination decision function 13 is able to refer to sequence information 11 and corresponding information 12.

The sequence information 11 is information generated based on information specific to each object. The arrangement destination decision function 13 generates first numbers by using the sequence information 11. The first numbers doesn't have correlation when generated from mutual different sequence information. Here, the relation of "doesn't have correlation when generated from mutual different sequence information" in the first number is supplemented. Assuming that while generating the first numbers L successively based on sequence information l, when the first numbers K are generated successively based on sequence information k, for example, this relation means a relation that the generated first number group K and the first number group L do not have a mutual relationship (correlation) approximately.

The corresponding information 12 is information with which an arrangement destination identifier which can distinguish (specify) an arrangement destination 14 and a second number were related in advance. The arrangement destination decision function 13 repeats generation of a new first number until the second number included in the corresponding information and the generated first number are identical by referring to the corresponding information 12. And, when one of second numbers and the generated first number are identical, in the generation process of the new first number, the arrangement destination decision function 13 decides to arrange an object as a decision target to an arrangement destination corresponding to the arrangement destination identifier related to the second number.

According to the object arrangement apparatus 10 having such configuration, by relatively easy processing configuration, objects are able to be arranged approximately uniformly to a plurality of arrangement destinations.

The sequence information 11 and the corresponding information 12 may be set from outside, or the object arrangement apparatus 10 may generate them by itself.

First Exemplary Embodiment

Figure 2:
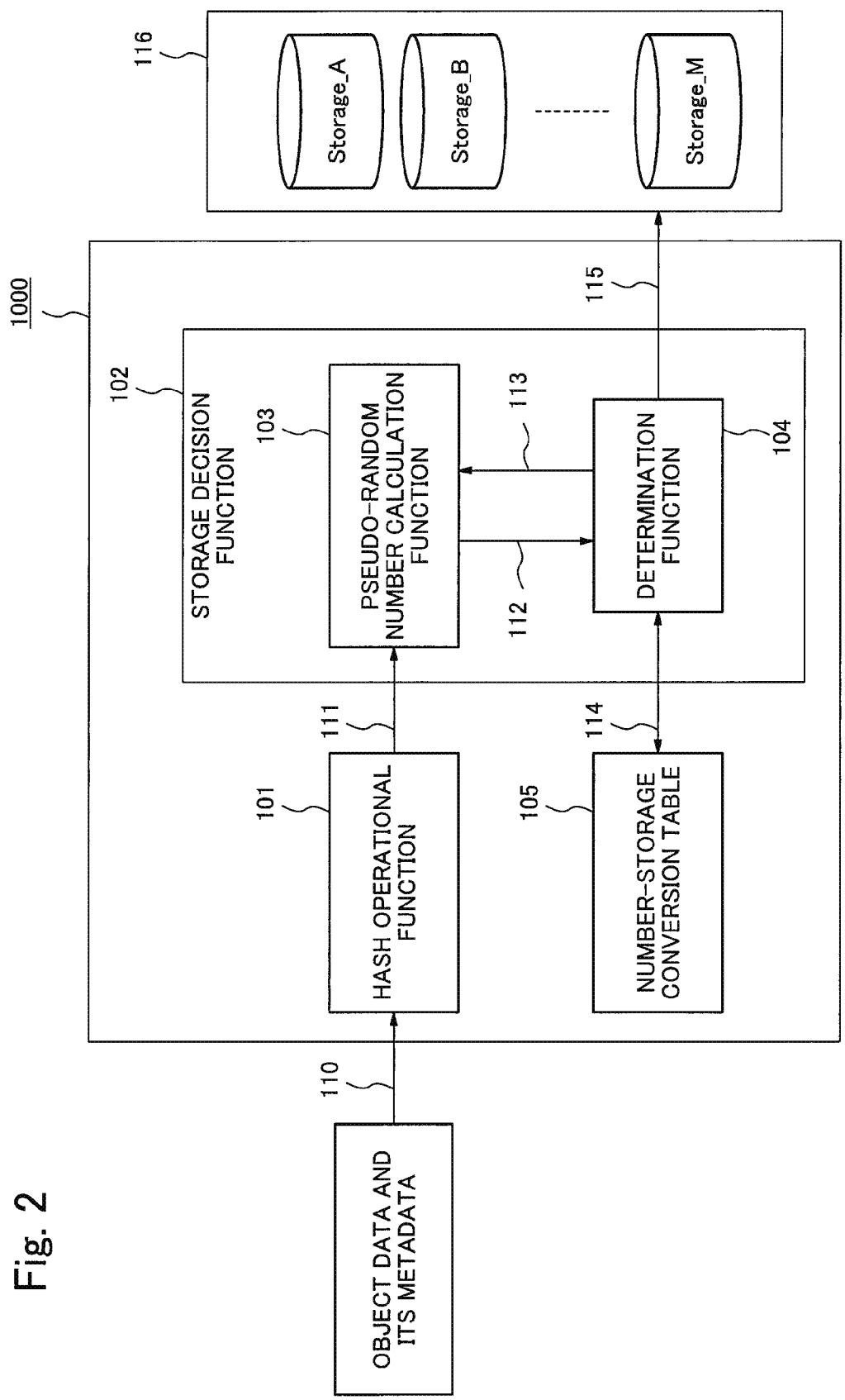
FIG. 2 is a block diagram showing a configuration of an object data arrangement apparatus in a first exemplary embodiment of the present invention.

FIG. 2 is a block diagram showing a configuration of an object data arrangement apparatus in a first exemplary embodiment of the present invention.

An object data arrangement apparatus 1000 is an apparatus which determines an arrangement destination of data (object data) as an object (arrangement target) to a storage 116 as an arrangement destination. In this embodiment, the object data composes at least any one of numerical data stored in the storage 116 and a software program (computer program) described a specified processing (a process, a function and an algorithm).

In this embodiment, the storage 116 includes a plurality of storages. The storage 116 includes a case where a plurality of storages which exists physically is connected by a communication line, a case where a plurality of virtual storage is constituted inside the storage which exists physically, or a case of combination thereof (it can be said in each embodiment described below).

Figure 18:
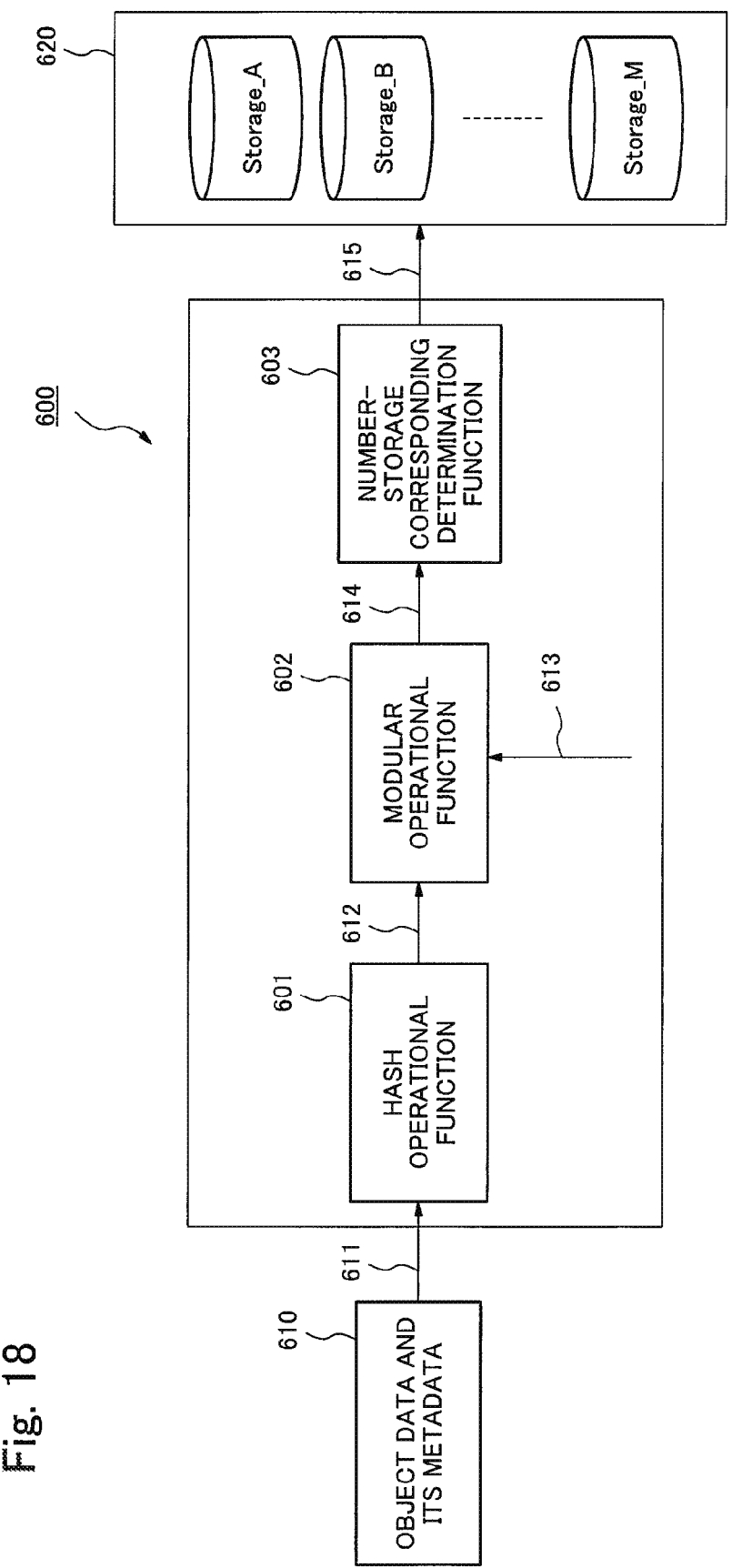
FIG. 18 is a chart illustrating a related art which exists before the present application was filed.

Same as the system 600 described above with reference to FIG. 18, the object data arrangement apparatus 1000 determines, by specified calculation, a storage which should record (storing) target object data from a plurality of storages based on information (metadata 110) specific to object data such as an address, an object name, a name of directory, a file name, or the like. However, without performing modular arithmetic, the object data arrangement apparatus 1000 according to this embodiment repeats generation of a random number (pseudo-random number) by using a hash as a seed (an initial value). That is, in this embodiment, generation of a random number is repeated until a random number corresponding to a specified storage in the plurality of storages is outputted. This point is different from the system 600 which performs the modular arithmetic to the hash value as a calculation method.

According to a method to describe in detail below in this embodiment, when the number of storage is changed, change of the storage which records object data is minimally-suppressed. For example, when a plurality of storages exists physically, the number of storage represents number of those storages. And, in case of a virtual storage, the number of storage represents virtual partition of a physical storage.

In a broad sense, the object data arrangement apparatus 1000 includes a hash operational function 101 and a storage decision function 102, and is able to refer to a number-storage conversion table 105. And the storage decision function 102 includes a pseudo-random number calculation function 103 and a determining function (a judgment function) 104.

In this embodiment, the metadata 110 of the object data and the object data are treated by a set (a pair) outside of the object data arrangement apparatus 1000. For example, in response to a write instruction to the storage 116 is issued in an external apparatus, the metadata 110 is inputted to the object data arrangement apparatus 1000.

By performing a hash operation based on the metadata 110, the hash operational function 101 outputs a hash 111. It is possible for the hash operation to apply an operation which outputs the metadata as it is, or an operation which outputs after processing. The hash 111 is an example of sequence information generated based on information (metadata 110) specific to the object data.

The storage decision function 102 as the arrangement destination decision function outputs storage information 115, by carrying out a processing procedure described below based on the hash 111 and information 114 (second number) obtained by reference of a number-storage conversion table 105.

The number as the information 114 (second number) and storage identification information (storage identifier and the storage ID) as storage information 115 (an arrangement destination identifier) are associated as illustrated notionally in FIGS. 10A and 10B in the number-storage conversion table 105 as the corresponding information. In an example shown in FIG. 10A, the storage identification information corresponds to the number in one-to-one.

However, the storage identification information does not have to correspond to the number in 1 to 1. That is, in an example shown in FIG. 10B as the storage identification information, the identical storage ID (=5) is related to the numbers (second numbers) 3 and 4. The storage information 115 (storage identification information) may indicate a plurality of areas in the identical storage apparatus. More specifically, the storage decision function 102 decides to record a plurality of object data (two in FIG. 10B) as much as the number (the second number) associated with the storage corresponding to the storage ID=5, for example, when the storage of the storage ID=5 has a big storage capacity compared with other storage. According to such the number-storage conversion table 105, even when the recording (storage) capacity of a plurality of storages as the arrangement destination is different from each other, the object data arrangement apparatus 1000 is able to perform the most suitable arrangement in consideration of the storage capacity of the each storage. Further, the storage information 115 may indicate an area of a plurality of storage apparatuses contrary to the example shown in the above-mentioned FIG. 10B.

The number-storage conversion table 105 is set at a suitable time from outside of the object data arrangement apparatus 1000 (the object arrangement apparatus 1000 may generate by itself).

In the storage decision function 102, the pseudo-random number calculation function 103 employs the hash 111 as a seed (an initial value), and generates a random number 112 as a first number. The pseudo-random number calculation function 103 generates a reproducible sequence in which the generated number is random and the occurrence probability thereof is nearly equal.

An arbitrary algorithm can be applied as an algorithm to be applied to the pseudo-random number operational function 103, if the algorithm generates a same random number sequence with a same seed. However, it may be preferably adopted an algorithm which generates a uniform random number for the pseudo-random number operational function 103 (it can be said in each embodiment described below). The reason why the uniform random number is adopted is that deviation in the number of the object data in the each storage will occurs if the outputted random number value is not uniform. The more uniform random number value is outputted, the more uniform object data is also distributed in the each storage.

In the storage decision function 102, the determination function 104 determines whether or not the number that is identical with the random number 112 exists in the number-storage conversion table 105 based on the information 114. As a result of the determination, when the number that is identical with the random number 112 exists in the number-storage conversion table 105, the judgment function 104 outputs the storage information 115. Thereby, the target object data is determined to be arranged in the storage with the storage ID corresponding to the storage information 115.

On the other hand, as a result of the determination, when the number that is identical with the random number 112 does not exist in the number-storage conversion table 105, by sending a re-calculation instruction 113 to the pseudo-random number calculation function 103, the determination function 104 orders to generate the next random number 112 to the pseudo-random number calculation function 103.

Next, an operation of the object data arrangement apparatus 1000 having aforementioned configuration will be described more specifically with reference to a FIG. 3 and FIG. 6 to FIG. 9.

FIG. 6 is a chart explaining an arrangement operation of the object data according to the object data arrangement apparatus according to the first exemplary embodiment of the present invention. An example shown in FIG. 6 indicates the situation that the object data arrangement apparatus 1000 arranged approximately uniformly seventeen object data (DATA0-DATA16) into fifteen empty storages (storage ID=0-14) as an initial state.

That is, in the example shown in FIG. 6, the pseudo-random number calculation function 103 outputs the number (random number) from 0 to 31 at random as an example. When outputted random numbers are one of numbers of from 0 to 14 (fifteen kinds), the judgment function 104 determines, by referring to the number-storage conversion table 105, that a corresponding storage exists. That is, in FIG. 6, the descriptions "First time", "Second time" and "Third time" represent that the pseudo-random number calculation function 103 generates a random number repeatedly until a storage of the arrangement destination is found. And in the column representing the individual time, a random number output value is an output (112) of a random number generated by the pseudo-random number calculation function 103 at the time.

"Decision result" represents a decision result by the determination function 104. More specifically, in FIG. 6, when being determined that the corresponding storage exists, it will be described as "OK", and when being determined that it does not exist, described as "NG", and when not used, described as "NOP".

And a right end column shown in FIG. 6 is an output (115) as the storage decision function 102 (the object data arrangement apparatus 1000), and each number represents a storage ID for fifteen storages. For example, referring to DATA0, the first random number output value is 0 (<15), and the decision result is OK. Therefore, the arrangement destination of DATA0 is the storage corresponding to the storage "ID=0". Referring to DATA6, the first random number output value is 19 (>15), and the determination result is NG, and the second random number output value is 5 (<15), and the decision result is OK. Therefore, the arrangement destination of DATA6 is the storage corresponding to the storage "ID=5". And, by the similar processing configuration, in cases of DATA8 and 13, the random number output value up to the second time is NG, and the third random number output value is finally determined to be OK. Therefore, in cases of DATA 8 and 13, as shown in FIG. 6, the storages corresponding to the storages "ID=13 and 9", respectively are determined to be the arrangement destinations.

Figure 8:
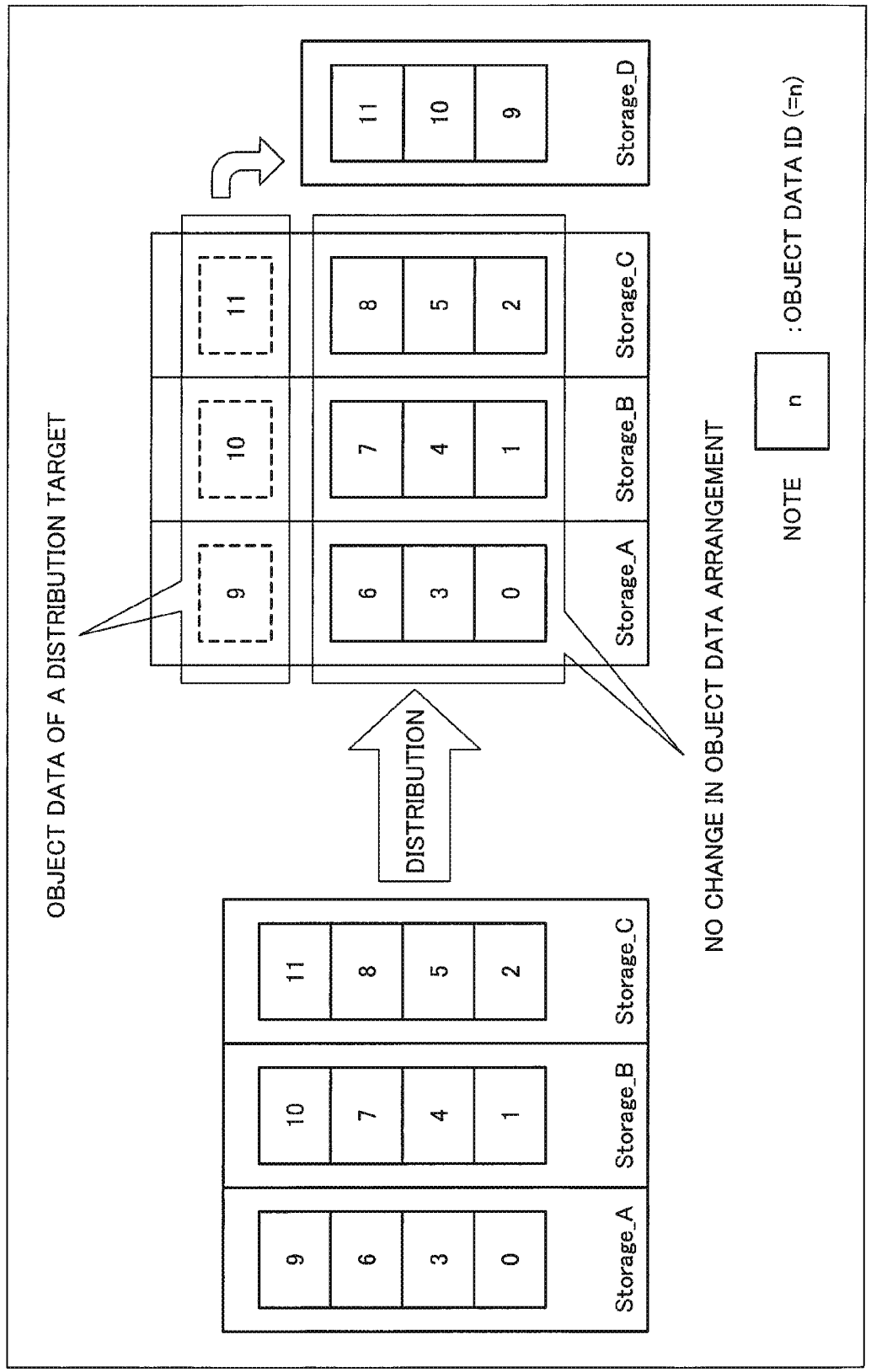
FIG. 8 is a chart explaining conceptually an operation accompanying increase of a storage by the object data arrangement apparatus according to the first exemplary embodiment of the present invention.

Next, a case where the storages increase n from m (m<n, m, n: a natural number) will be described with reference to FIG. 7 and FIG. 8. For example, a case when one hundred and thirty two object data are stored uniformly by using eleven storages is considered. In this case, the each storage holds twelve object data. And the case where one set of storage to use is increased newly from this state and twelve sets of the storages in total are used is considered. In this case, in order to distributionally and uniformly arrange the one hundred and thirty two object data into the twelve storages, the each storage must hold the eleven object data. Therefore, at least the eleven object data among the one hundred and thirty two object data become movement (relocation) targets to the new storage. Generally, when increasing the storages n from m (m<n, m, n: a natural number), unless the object data corresponding to the proportion of (n−m)/m is moved at the lowest, the object data cannot be distributionally arranged approximately uniformly. That is, 132×(n−m)/n=132×(12−11)/12=11 ("/" represents division in the present application, and it can be said in each embodiment hereinafter). FIG. 8 is a chart explaining conceptually an operation accompanying increase of the storage by the object data arrangement apparatus according to the first exemplary embodiment of the present invention. FIG. 8 is illustrating the case where the numbers of the object data were twelve, and the storages increased four from three in the explanation mentioned above.

According to the object data arrangement apparatus 1000 of this embodiment, the random numbers, which had already existed when the sets of the storages were m, determined by the storage decision function 102 that there are existing the second numbers corresponding thereto among the random numbers (first numbers), after the sets of the storages increase from m to n, are the same as the random numbers determined by the storage decision function 102 that there had been existing the corresponding second numbers corresponding thereto when the sets of the storages were m. On the other hand, only the random number corresponding to the increased storage, which did not exist when the sets of the storages were m, changes to a different value from the random number outputted by the storage decision function 102 when the sets of the storages were m.

That is, when the sets of the storages increase to n from m, the numbers (second numbers) that there are existing the storages corresponding thereto increase by (n−m), while the random numbers (first numbers) determined by the storage decision function 102 that there are existing the corresponding second numbers distribute approximately uniformly. The random numbers determined by the storage decision function 102 that there are already existing the corresponding second numbers, when the sets of the storages were m, are not changed. Therefore, the random numbers determined by the storage decision function 102 that there are existing the corresponding second numbers will be different values by a probability as $(n-m)/n$. This means that the storage which records the object data is changed by the probability of $(n-m)/n$. In other words, in this embodiment, when the sets of the storages is increased to n from m, in order to distributionally arrange a plurality of object data arranged approximately uniformly in the m sets of the storages to the n sets of the storages approximately uniformly, movement of the object data occurs at a rate (probability) of $(n-m)/m$ among those object data. On the contrary, it means that the object data among a plurality of object data already stored in the m sets of the storages, do not move with the probability of $1-((n-m)/n)$, even if the storages increase to the n sets.

In the method described above, the data movement amount (movement number of the object data) is remarkably small, as compared with a method for relocating all the object data already stored in n sets of the storages to m sets of the storages. And, according to this embodiment, change of the storage storing the object data only occurs by the rate of $(n-m)/n$. Therefore, an ideal movement of the object data can be realized. According to this embodiment, the object data after movement are distributionally stored in the n sets of the storages approximately uniformly.

FIG. 7 is a chart explaining an operation of the object data arrangement apparatus according to the first exemplary embodiment of the present invention when adding a storage from the arrangement state shown in FIG. 6. That is, an example shown in FIG. 7 represents an operation of the object data arrangement apparatus 1000 for adding the sixteenth new storage (storage ID=15), when it is determined that the number (second number) corresponding to the new storage was added to the number-storage conversion table 105

The basic point of view of FIG. 7 is similar to the case of FIG. 6 mentioned above. And, in FIG. 7, the part changed from the state shown in FIG. 6 is represented with an arrow which ties before change and after the change. DATA8 and DATA13 move to the storage (storage ID=15 corresponding to the number 15) assigned newly.

Thus, when the contents of a number-storage conversion table 105 are updated by the contents different from time referred to last time, an object data arrangement apparatus 1000 may recognize that new storage information (a storage identifier) 115 which did not exist when referring to it last time, is added to the number-storage conversion table 105 after updating. In this case, the object data arrangement apparatus 1000 compares the number (second number) included in the number-storage conversion table 105 after updating and a random number (first number) which the pseudo-random number calculation function 103 generates. And in accordance that the second number is identical with the first number, the object data arrangement apparatus 1000 determines that the storage corresponding to the storage identifier associated with the second number as a new arrangement destination of the object data whose arrangement destination have been determined.

Next, a case where the storages decrease to b sets from a sets (a>b, a, b: natural number) will be described with reference to FIG. 9. In this case, a probability that the storage decision function 102 had determined, before the storages decreased, the specified random numbers to which the corresponding storages did not exist as the second numbers corresponding to the specified random numbers existed, is $(a-b)/a$, because the random numbers to which corresponding storages did not exist by $(a-b)$. The values do not change besides these random numbers. In other words, the random number determined by the storage decision function 102 that there is existing the corresponding second number is a different value in the proportion (probability) of $(a-b)/a$. This means that it is necessary to change the storage which records the object data by the probability of $(a-b)/a$. That is, when the storages are reduced to b sets from a sets, in order to distributionally arrange the object data arranged in the storages of a sets approximately uniformly to the storages of b sets approximately uniformly, it is necessary to move the object data by the proportion (probability) of $(a-b)/a$. This embodiment is ideal because it just needs to change the storage which should record the object data by the proportion of $(a-b)/a$, when the storages decrease. The object data after movement is distributionally stored in the b storages approximately uniformly.

FIG. 9 is a chart explaining an operation of the object data arrangement apparatus according to the first exemplary embodiment of the present invention when decreasing storages from the arrangement state shown in FIG. 6. That is, in the example shown in FIG. 9 shows the operation of the object data arrangement apparatus 1000, when it is determined that the number (second number) corresponding to the storage was deleted from the number-storage conversion table 105 in order to reduce the storage corresponding to the storage ID=12.

The basic point of view of FIG. 9 is similar to the case of FIG. 6 mentioned above. However, in this case, one set is deleted from fifteen sets storages at the beginning, and it becomes fourteen sets. In FIG. 9, the parts changed from the state shown in FIG. 6 are represented with an arrow which ties before change and after change. And FIG. 9 indicates that two object data (DATA1 and DATA7) stored in the storage (storage ID=12) as a deletion target is changed to record in the other storage.

Thus, the object data arrangement apparatus 1000 may recognize that the storage information (storage identifier) 115 corresponding to the storage in which the object data was recorded is not included in the number-storage conversion table 105 after updating for the object data whose arrangement destinations (storages for recording) have been determined. In this case, the object data arrangement apparatus 1000 compares the number (second number) included in the number-storage conversion table 105 and the random number (first number) generated by the pseudo-random number calculation function 103 with reference to the number-storage conversion table 105 after the update. And in accordance that the second number is identical with the first number, the object data arrangement apparatus 1000 determines that the storage corresponding to the storage identifier associated with the second number as a new arrangement destination of the object data whose arrangement destination have been determined.

Next, the arrangement processing of the object data arrangement apparatus 1000 performs, in order to realize the series of operation according to this exemplary embodiment described above, will be described with reference to FIG. 3

Figure 3:
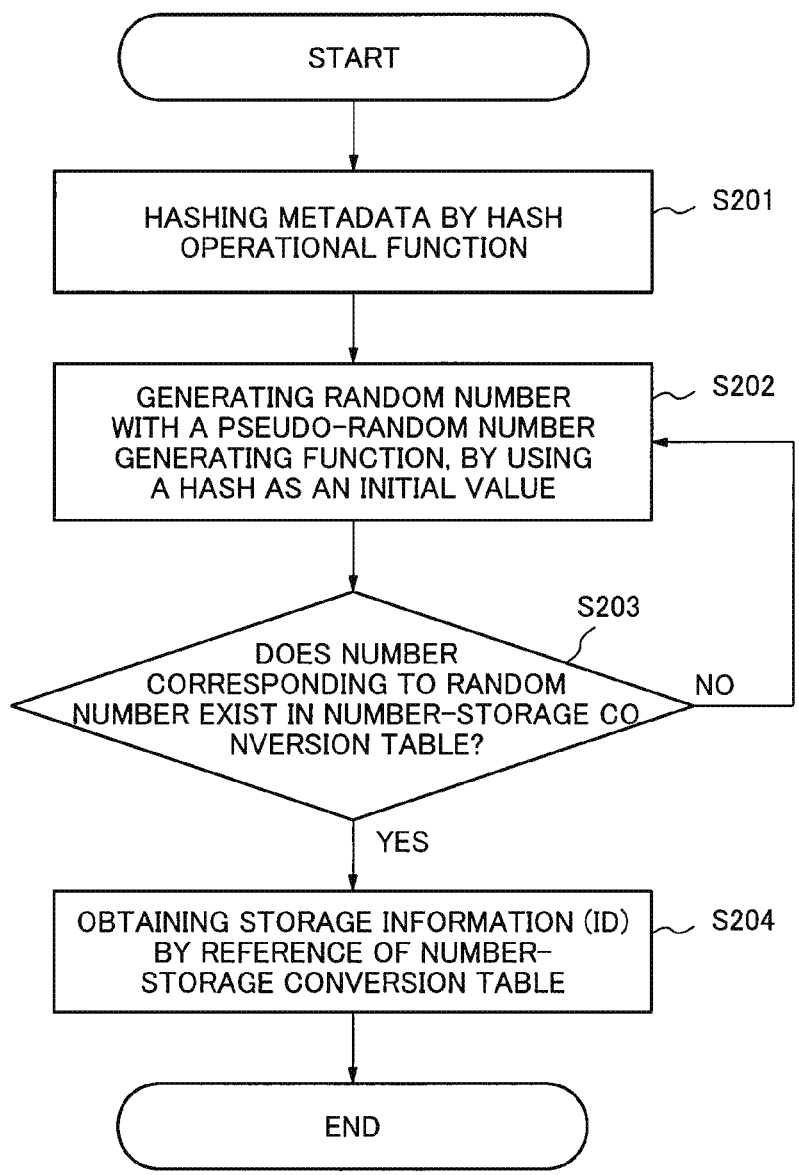
FIG. 3 is a flowchart showing an arrangement processing of an object data which the object data arrangement apparatus according to the first exemplary embodiment of the present invention performs.

FIG. 3 is a flow chart showing the arrangement processing of the object data which the object data arrangement apparatus according to the first exemplary embodiment of the present invention performs. Here, when the object data arrangement apparatus 1000 is realized by a computer, a CPU (Central Processing Unit) of the computer will execute processing of each step described below (detailed description will be made later with reference to FIG. 16 and FIG. 17).

Step S201: The hash operational function 101 obtains the hash 111 by performing a hash operation based on the metadata 110 of the target object data. And the hash operational function 101 provides the hash 111 to the pseudo-random number calculation function 103. Here, the target object data is an object data which should be determined the storage to be stored (it can be said in each embodiment hereinafter).

Step S202: The pseudo-random number calculation function 103 sets the acquired hash 111 to a seed (an initial value) and generates the random number 112 by using the seed. And the pseudo-random number calculation function 103 provides the generated random number 112 (the first number) to the determination function 104.

Step S203: The determination function 104 determines whether or not the number (second number) corresponding to the random number 112 exists in the number-storage conversion table 105 by referring to information 114 sent from the number-storage conversion table 105.

When the random number 112 generated at Step S202 does not exist in the number-storage conversion table 105 (NO in Step S203), the processing is returned to Step S202. And the pseudo-random number calculation function 103 generates the next random number.

On the other hand, when the random number 112 generated at Step S202 exists in the number-storage conversion table 105 (YES in Step S203), the determination function 104 outputs, as the information 115, the storage identification information (the storage ID) associated with the number that is identical with the random number 112. That is, the information 115 is the information specifying the storage which should record the target object data.

According to the object data arrangement apparatus 1000 of this embodiment described above, by the comparatively easy processing configuration, the object data is able to be arranged approximately uniformly to the plurality of storages (arrangement destinations).

That is, in the storage decision function 102 of the object data arrangement apparatus 1000, the pseudo-random number calculation function 103 is able to repeat generation of the pseudo-random number (first number). The determination function 104 compares the generated first number and the second number included in the number-storage conversion table 105 with reference to the number-storage conversion table 105. And the determination function 104 determines, in response to the detection that the second number is identical with the first number, the storage corresponding to the storage ID associated with the second number as an arrangement destination of the object data.

According to this embodiment, even when the storage which records object data fluctuates, it can be realized that the object data are arranged approximately uniformly (evenly) in the each storage efficiently with a small operation amount by the minimum movement of the object data. Accordingly, by the method according to this embodiment, the arrangement of the object data can be maintained approximately uniformly with the minimum movement and few memory resources required for processing, even when the storage fluctuates, comparing with the art using the modular operation explained as the related art and the art indicated in the non-patent literature 1. Therefore, according to the method of this embodiment, for example, even in a system for a huge storage like a large-scale data center, the object data can be arranged approximately uniformly to a plurality of storages by a comparatively easy processing configuration without interrupting the provided service.

Modification of First Embodiment

Figure 12:
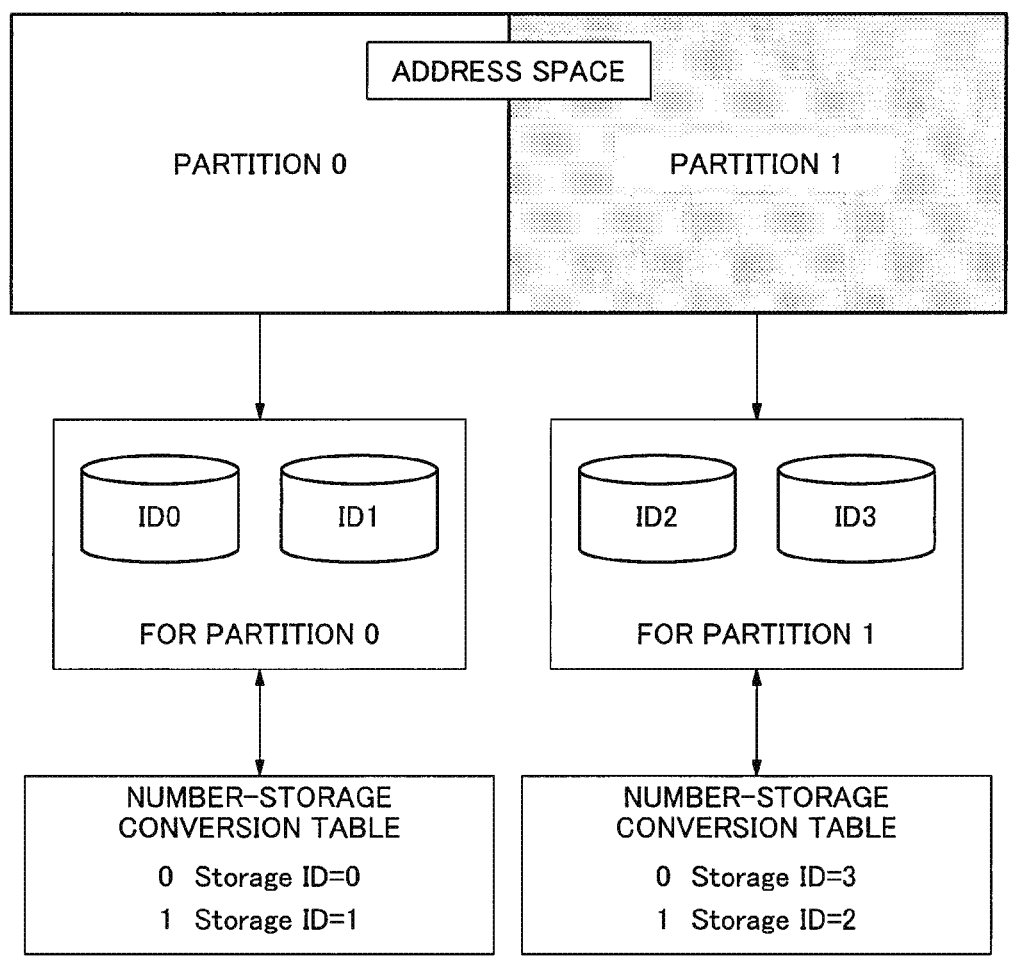
FIG. 12 is a chart explaining a modification according to the first exemplary embodiment of the present invention.

In the first embodiment mentioned above, although the single number-storage conversion table was used, but is not limited to it. That is, it can be assumed that an object data arrangement apparatus which uses a plurality of number-storage conversion tables appropriately according to conditions. More specifically, for example, there is a case to change a storage destination of an object data in accordance with an address. That is, the partitions are formed in an address space by using the address, and a system which changes a storage group to record is assumed for the every partition, as shown in FIG. 12. In such case, according to the address, a mode which changes a number-storage conversion table to be used among a plurality of number-storage conversion tables. Alternatively, in a Key-Value Store, when changing a storage group to record for every range of Key, a mode of changing a number-storage conversion table is also assumed for every range related to each Key. That is, in this case, the storage decision function 102 can refer to a plurality of number-storage conversion tables, and it determines the storage which should arrange the object data based on the object data information by referring to the number-storage conversion table corresponding to the object data information among those number-storage conversion tables.

As an example of using a plurality of number-storage conversion tables appropriately, the example in consideration of protective level of the object data will be described below.

The protective level to be needed may be different, depending on the object data. In such case, the level of the RAID (Redundant Arrays of Inexpensive Disks) method different depending on the storage may be set. And the object data required a high protective level should be stored in the storage which set up the RAID method with the high degree of multiplexing. On the other hand, the object data required a low protective level should be stored in the storage which set up the RAID method with the low degree of multiplexing. In this case, for example, two kinds of number-storage conversion tables (105A and 105B: each not shown) are prepared instead of the number-storage conversion table 105 shown in FIG. 2.

That is, the storage (storage identification information) which set the RAID method with the high degree of multiplexing and the number (the second number) are related in the number-storage conversion table 105A. On the other hand, the storage (storage identification information) which set the RAID method with the low degree of multiplexing and the number (second number) are related in the number-storage conversion table 105B. According to a mode which uses such a plurality of number-storage conversion tables appropriately, the arrangement processing matting the protective level required by the object data is realized.

Hereinafter, an operation of the object data arrangement apparatus in consideration of the protective level of the object data will be described with reference to the flowchart shown in FIG. 3.

First, the hash operational function 101 obtains a hash 111 by performing the hash operation based on the metadata 110 of the target object data (Step S201). In this modification, the metadata 110 includes the protective level corresponding to the object data. The pseudo-random number calculation function 103 sets the hash 111 to a seed (an initial value) and generates the random number 112 by using the seed (Step S202).

And the determination function 104 selects the number-storage conversion table corresponding to the metadata 110 among the number-storage conversion table 105A and the number-storage conversion table 105B based on the metadata 110. And by referring to the information 114 which is obtained from the selected number-storage conversion table, the determination function 104 determines whether or not the number (second number) corresponding to the random number 112 obtained by the pseudo-random number calculation function 103 exists in the number-storage conversion table 105 (Step S203).

When the random number 112 generated at Step S202 does not exist in the number-storage conversion table selected at Step S203 (NO in Step S203, the processing is returned to Step S202. And the pseudo-random number calculation function 103 generates the next random number.

On the other hand, when the random number 112 generated at Step S202 exists in the number-storage conversion table selected at Step S203 (YES in Step S203), the determination function 104 outputs, as information 115, the storage identification information (the storage ID) related with the number that is identical with the random number 112. As a result, the storage to record the target object data is determined.

In this embodiment, although the random number (pseudo-random number) is used as mentioned above, the present invention is not limited to this configuration. That is, if it is a number generation function which always generate the same number group for one data, and the generated number group does not correlate mutually (correlation is thin), it can be adopted instead of the pseudo-random number calculation function 103 described above. For example, when only one number is not a pseudo-random number among the numbers generated successively, the value formed by mixing a remainder of the metadata 110 when dividing the metadata 110 by a specified value may be used. In this case, because calculation cost thereof is lower than generation of a random number, higher-speed calculation can be realized.

In this embodiment, although the hash is used as the seed as described above, the present invention is not limited to this configuration. For example, address may be used as a seed in case that a storage managed by the address.

Second Exemplary Embodiment

Next, a second embodiment based on the object data arrangement apparatus 1000 according to the first embodiment mentioned above will be described. In this embodiment, following description will be focused on its characteristic part, and an overlapped description for the same configuration as the first exemplary embodiment mentioned above is omitted.

The first embodiment described above is assumed that the number (second number) registered in the number-storage conversion table 105 is the value in the range of the random number generated by the pseudo-random number calculation function 103. In contrast, in this embodiment, a method which is not limited to such assumption will be described.

Figure 4:
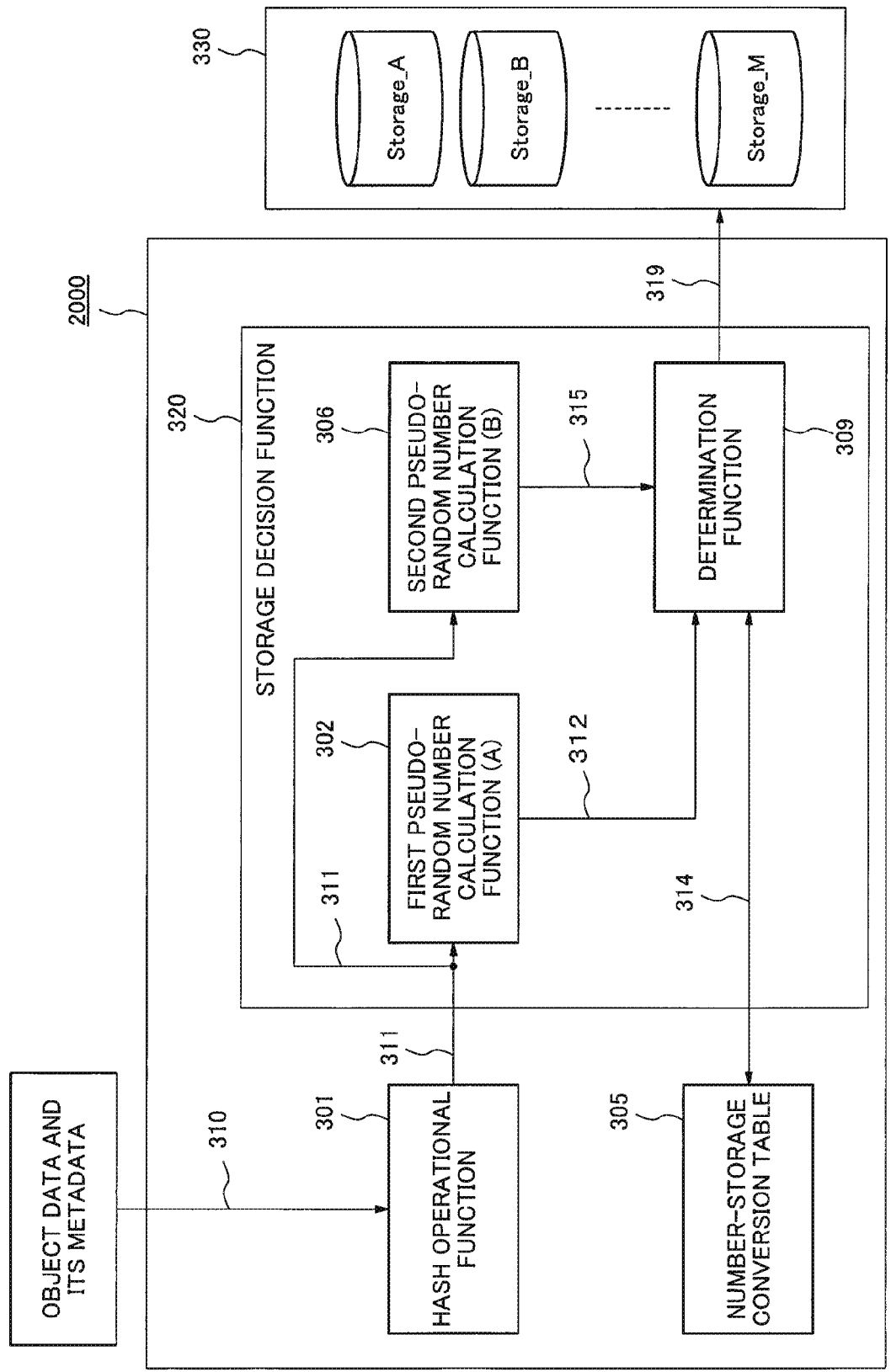
FIG. 4 is a block diagram showing a configuration of an object data arrangement apparatus in a second exemplary embodiment of the present invention.

FIG. 4 is a block diagram showing a configuration of an object data arrangement apparatus in a second exemplary embodiment of the present invention.

An object data arrangement apparatus 2000 is an apparatus which determines an arrangement destination of data (object data) as an object (arrangement target) to a storage 330 as an arrangement destination. In this exemplary embodiment, the object data includes at least any one of numerical data stored in storage 330 and a software program describing a specified processing (a process, a function and an algorithm).

The object data arrangement apparatus 2000 includes, in a broad sense, a hash operational function 301 and a storage decision function 320, and is able to refer to a number-storage conversion table 305. And the storage decision function 320 includes a pseudo-random number calculation function (A) 302 as a first pseudo-random number calculation function, a pseudo-random number calculation function (B) 306 as a second pseudo-random number calculation function and a determination function (a determining function) 309. That is, the object data arrangement apparatus 2000 is provided with a plurality of pseudo-random number calculation functions inside of the storage decision function 320.

In this exemplary embodiment, an object data and a metadata 310 thereof are treated by a set (a pair) outside of the object data arrangement apparatus 2000. For example, in response to issuing a write instruction to the storage 330 in an external apparatus, the metadata 310 is inputted to the object data arrangement apparatus 2000.

By performing a hash operation based on the metadata 310, the hash operational function 301 outputs a hash 311. It is possible for the hash operation to apply an operation which outputs the metadata as it is, or an operation which outputs after processing. The hash 311 is an example of sequence information generated based on information (metadata 310) specific to the object data. And as the metadata 310, for example, an address, an object name, a directory-name or a file name is assumed.

The pseudo-random number calculation function (A) 302 employs the hash 311 as a seed (an initial value) and generates a random number (A) 312. On the other hand, the pseudo-random number calculation function (B) 306 employs the hash 311 as a seed and generates a random number (B) 315. However, an upper limit value of the pseudo-random number calculation function (B) 306 is bigger than an upper limit value of the random number which the pseudo-random number calculation function (A) 303 generates.

And the object data arrangement apparatus 2000 according to this embodiment is not taking into consideration a case where the upper limit of the random number which the pseudo-random number calculation function (B) 306 generates is smaller than the maximum number (second number) registered in the number-storage conversion table 305. Description for a configuration considered this point will be made later with reference to FIG. 11.

The number-storage conversion table 305 has the same configuration as the number-storage conversion table 105 in the first embodiment described above. Therefore, storage information registered in the number-storage conversion table 305 does not need to correspond one-on-one to the storage apparatus as mentioned above in the first embodiment.

When the biggest number registered in the number-storage conversion table 305 is no more than the upper limit value of the random number which the pseudo-random number calculation function (A) 302 generates, the storage decision function 320 determines whether or not a storage corresponding to the random number (A) 312 exists.

Here, an expression of "to determine (decide) whether or not a storage corresponding to a random number X exists" which is applied in the following explanation is defined. This expression represents processing to determine whether or not there is a number that matches the random number X in the number (second number) that is associated with a number-storage conversion table to be referred and processing to determine that there is existing a storage associated with its number in case where there is existing the number that matches the random number X in the determination (it can be said in each embodiment below).

And when determined that it does not exist, the storage decision function 320 redoes to generate a random number A 312 by the pseudo-random number calculation function (A) 302. On the other hand, when determined that it exists, the storage decision function 320 outputs storage information 319 as information capable of discriminating the storage corresponding to the random number (A) 302.

On the other hand, when the biggest number registered in the number-storage conversion table 305 is bigger than the upper limit value of the random number which the pseudo-random number calculation function (A) 302 generates, the storage decision function 320 compares the upper limit value of the random number with the random number (B) 315 which the pseudo-random number calculation function (B) 306 generates. As a result of the comparison, when the random number B 315 is bigger than the upper limit value of the random number concerned, the storage decision function 320 determines whether or not the storage corresponding to the random number (B) 315 exists. And when determined that it does not exist, the storage decision function 320 redoes (repeat) to generate the random number (A) 312 by the pseudo-random number calculation function (A) 302. On the other hand, when determined that it exists, the storage decision function 320 outputs storage information 319 as information capable of discriminating the storage corresponding to the random number (B) 315.

And as a case left, a case where the random number (B) 315 is the same as the upper limit value of the random number concerned, or a case where the upper limit value of the random number concerned is smaller than the random number (B) 315 is assumed, when the upper limit value of the random number which the pseudo-random number calculation function (A) 302 generates is compared with the random number (B) 315 which the pseudo-random number calculation function (B) 306 generates. In this case, the storage decision function 320 determines whether or not the storage corresponding to the random number (A) 312 exists. And when determined that it does not exist, the storage decision function 320 redoes to generate the random number (A) 312 by the pseudo-random number calculation function (A) 302. On the other hand, when determined that it exists, the storage decision function 320 outputs storage information 319 as information capable of discriminating the storage corresponding to the random number (A) 312.

Next, in order to realize a series of the operation according to this embodiment mentioned above, arrangement processing of object data which the object data arrangement apparatus 2000 performs will be described with reference to FIG. 5. In the processing explained below, it is based on the assumption that the maximum number registered in the number-storage conversion table 305 as the second number is bigger than the upper limit value of the random number which the pseudo-random number calculation function (A) 302 generates, and it is no more than the upper limit value of the random number which the pseudo-random number calculation function (B) 306 generates.

Figure 5:
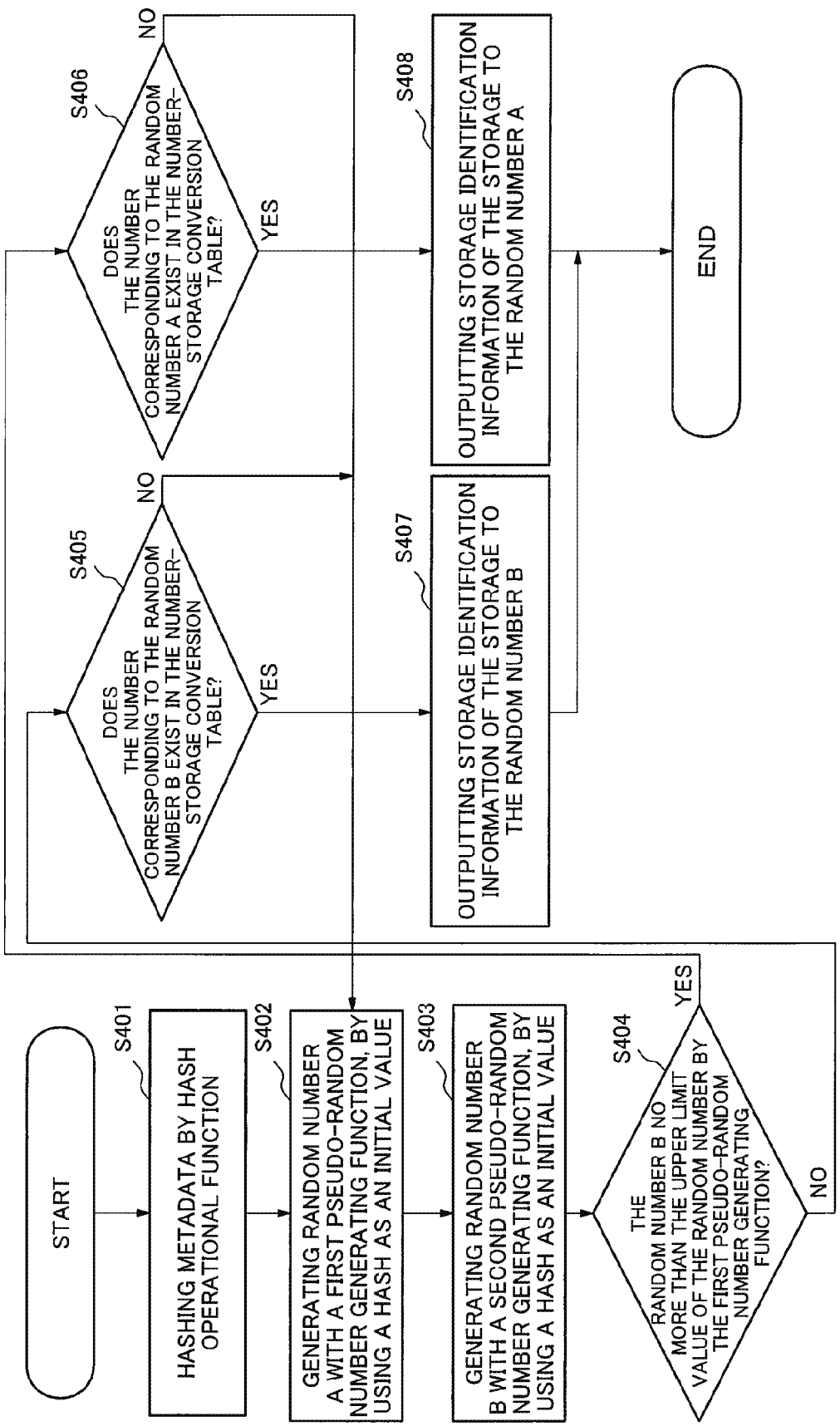
FIG. 5 is a flowchart showing an arrangement processing of an object data which the object data arrangement apparatus according to the second exemplary embodiment of the present invention performs.

FIG. 5 is a flowchart showing an arrangement processing of an object data which the object data arrangement apparatus according to the second exemplary embodiment of the present invention performs. Here, when the object data arrangement apparatus 2000 is realized by a computer, a CPU (Central Processing Unit) of the computer will execute processing of each step described below (detail will be described later with reference to FIG. 16 and FIG. 17).

Step S401: By performing a hash operation based on the metadata 310 of the target object data, the hash operational function 301 obtains the hash 311. And the hash operational function 301 provides the hash 311 to the pseudo-random number calculation function (A) 302 and the pseudo-random number calculation function (B) 306.

Step S402: The pseudo-random number calculation function (A) 303 sets the acquired hash 311 as a seed (an initial value) and generates the random number (A) 312 by using the seed. And the pseudo-random number calculation function (A) 303 provides the generated random number (A) 312 to the determination function 309.

Step S403: After the processing of Step S402 mentioned above is finished, or in parallel to the processing of S402, the pseudo-random number calculation function (B) 306 sets the acquired hash 311 as a seed (an initial value) and generates the random number (B) 315 by using the seed. That is, in the flowchart shown in FIG. 5, the processing by the pseudo-random number calculation function (A) 303 and the processing by the pseudo-random number calculation function (B) 306 are described so that they may perform in turn. However, the object data arrangement apparatus 2000 may perform to execute these plural pseudo-random number calculation functions simultaneously in order to obtain a final decision result for a short time. And the pseudo-random number calculation function (B) 306 provides the generated random number (B) 315 to the determination function 309.

Further, the hash value that the pseudo-random number calculation function (A) 302 uses, and the hash value that the pseudo-random number calculation function (B) 306 uses may not be identical. That is, when they are hashes obtained based on the metadata 310, these hash values may be obtained by mutual different hash operations.

Step S404: The determination function 309 compares the random number (B) 315 and the upper limit value of the random number of the pseudo-random number calculation function (A) 302. As a result of this determination, when the random number (B) 315 is no more than the upper limit value of the random number of the pseudo-random number calculation function (A) 302 (YES in Step S404), the processing is advanced to Step S406. On the other hand, when the random number (B) 315 is bigger than the upper limit value of the random number of the pseudo-random number calculation function (A) 302 (NO in Step S404), the processing is advanced to Step S405.

Step S405: The determination function 309 determines whether or not a storage corresponding to the random number (B) 315 exists. As a result of this determination, when the storage corresponding to the random number (B) 315 exists (YES in Step S405), the processing is advanced to Step S407. On the other hand, when not exists, the processing is returned to Step S402.

Step S406: The determination function 309 determines whether or not a storage corresponding to the random number (A) 312 exists. As a result of this determination, when the storage corresponding to the random number (A) 312 exists (YES in Step S406), the processing is advanced to Step S408. On the other hand, when not exists, the processing is returned to Step S402.

Step S407: As information capable of discriminating the storage corresponding to the random number (B) 315, the determination function 309 outputs the storage information 319.

Step S408: As information capable of discriminating the storage corresponding to the random number (A) 312, the determination function 309 outputs the storage information 319.

By the way, in the arrangement processing of the object data explained with reference to FIG. 4 and FIG. 5, it is based on the assumption that the maximum number registered in the number-storage conversion table 305 as the second number is bigger than the upper limit value of the random number which the pseudo-random number calculation function (A) 302 generates, and it is no more than the upper limit value of the random number which the pseudo-random number calculation function (B) 306 generates. Accordingly, in a modification described below, an equipment configuration (processing configuration) which is not constrained by such the assumption (the precondition) will be described with reference to FIG. 11.

That is, in this modification, when the biggest number registered in the number-storage conversion table 305 becomes bigger than the upper limit value of the random number which the pseudo-random number calculation function (B) 306 generates, a third pseudo-random number calculation function (a pseudo-random number calculation function C) is further added to the object data arrangement apparatus 2000 (the storage decision function 320). An upper limit value of the random number which the pseudo-random number calculation function C generates is bigger than the maximum number registered in the number-storage conversion table 305. Here, the numerical value range of the number (second number) registered in the number-storage conversion table (not shown) according to this modification will be described. The minimum value in the numerical value range thereof is no smaller than the minimum value of the number generated by the pseudo-random number generating function A. And the maximum value thereof is bigger than the maximum of the number generated by the pseudo-random number generating function B and is no more than the maximum of the number generated by the pseudo-random number generating function C.

Figure 11:
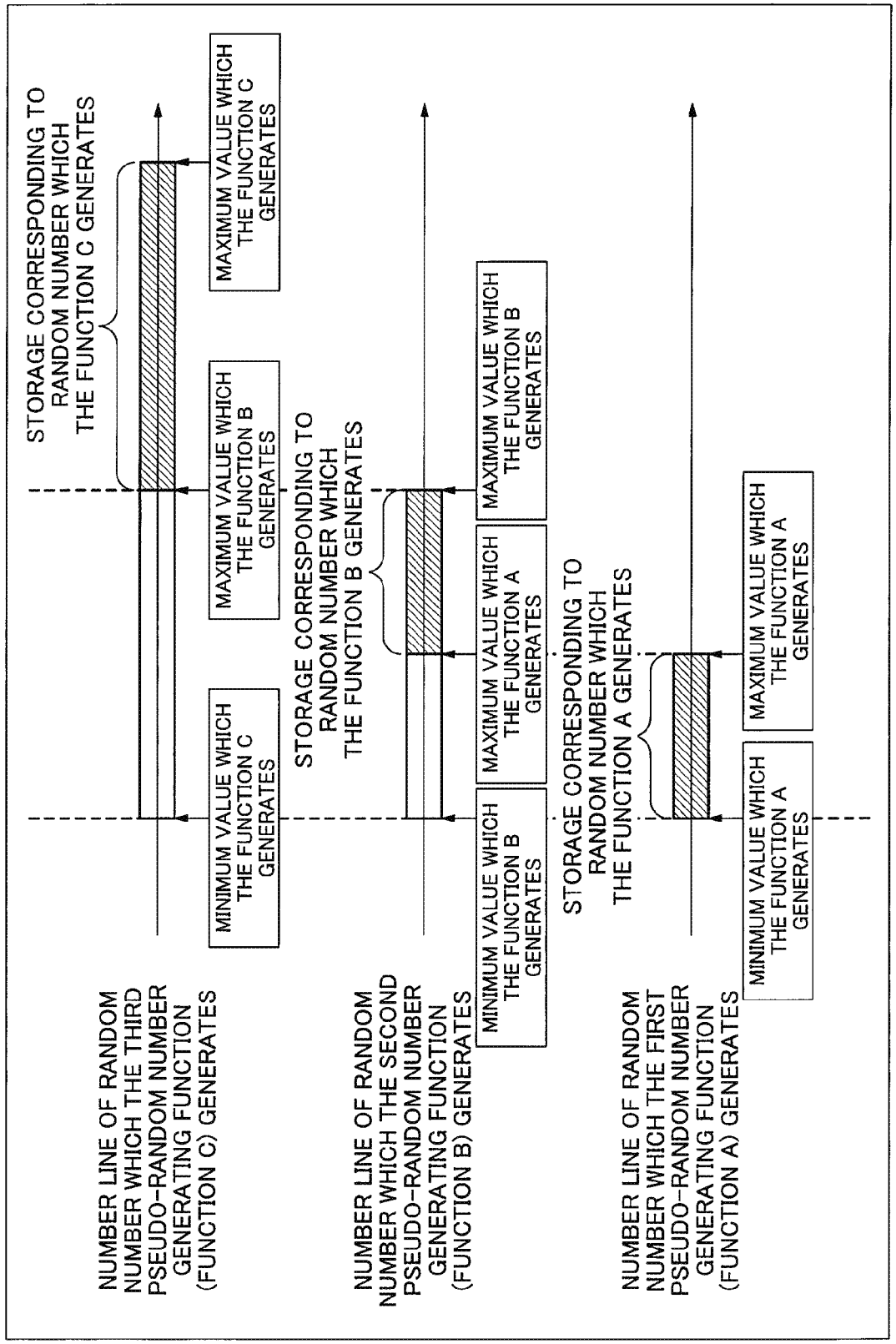
FIG. 11 is a chart explaining operations of three pseudo-random number generating functions according to a modification of the second exemplary embodiment.

FIG. 11 is a chart explaining operations of three pseudo-random number generating functions according to a modification of the second embodiment. A horizontal axis shown in FIG. 11 shows a random number which three pseudo-random number generating functions (A, B, C) generate with a number line. A belt-like range indicated on the each horizontal axis represents a range of a random number which each pseudo-random number generating function is able to generate. Here, the range is the range of the value from a certain value to the other value. And the range that attached a slanted line among the each belt-like range represents the range where a random number which a corresponding pseudo-random number generating function generates is adopted at the time of determining the storage.

The object data arrangement apparatus according to this modification is provided with three pseudo-random number generating functions having the random number generation ranges as shown in FIG. 11. And it operates as follows.

(1) When the random number value generated by the pseudo-random number generating function C exceeds the range of the random number value which the pseudo-random number generating function B can generate, it is determined whether or not there is a corresponding storage by using a random number which the pseudo-random number generating function C generates.

(2) When the random number value generated by the pseudo-random number generating function C is within the range of the random number value which the pseudo-random number generating function B can generate, a random number is generated by the pseudo-random number generating function B.

(3) When the random number value generated by the pseudo-random number generating function B exceeds the range of the random number value which the pseudo-random number generating function A can generate, it is determined whether or not there is a corresponding storage by using a random number which the pseudo-random number generating function B generates.

(4) When the random number value generated by the pseudo-random number generating function B is within the range of the random number value which the pseudo-random number generating function A can generate, a random number is generated by the pseudo-random number generating function A. And it is determined whether or not there is a corresponding storage by using the random number which the pseudo-random number generating function A generates.

Next, an arrangement processing of an object data, in case that uses the three pseudo-random number calculation functions mentioned above, will be described comparing with the flowchart shown in FIG. 5.

By performing the same processing as step S402 by the pseudo-random number calculation function (A) 302 or Step S403 by the pseudo-random number calculation function (B) 305, the pseudo-random number calculation function C outputs a random number C.

When the random number C is bigger than the upper limit value of the random number by the pseudo-random number calculation function (B) 306, the storage decision function 320 (determination function 309) determines whether or not a storage corresponding to the random number C exists in the determination of the storage. When determined that the storage thereof does not exist by this determination, the processing returns to Step S402. On the other hand, when it is determined that the storage thereof exist by this determination, the storage decision function 320 outputs storage information (a storage ID) corresponding to the random number C.

When the random number C is same as the upper limit value of the random number by the pseudo-random number calculation function (B) 307 or small, the storage decision function 320 compares the random number (B) 315 and the upper limit value of the random number by the pseudo-random number calculation function (A) 303. As a result of this comparison, when the random number (B) 315 is bigger than the upper limit value of the random number by the pseudo-random number calculation function (A) 303, the storage decision function 320 determines whether or not a storage corresponding to the random number (B) 315 exists. When determined that the storage thereof does not exist by this determination, the processing returns to Step S402. On the other hand, when determined that the storage thereof exists by this determination, the storage decision function 320 outputs storage information corresponding to the random number (B) 315.

When the random number (B) 315 is no more than the upper limit value of the random number by the pseudo-random number calculation function (A) 303, the storage decision function 320 determines whether a storage corresponding to the random number (A) 312 exists. When determined that the storage thereof does not exist by this determination, the processing returns to Step S402. On the other hand, when determined that the storage thereof exists by this determination, the storage decision function 320 outputs storage information corresponding to the random number (A) 312.

The generation of the random numbers by itself according to three pseudo-random number calculation functions mentioned above may be performed simultaneously in order to obtain the final determination result for a short time.

Here, the processing configuration according to this modification will be generalized and described. In this case, the object data arrangement apparatus includes a plurality of pseudo-random number calculation functions capable of generating a random number as a first number whose range of the random number differs mutually. In the plural pseudo-random number calculation functions, it is related that the range of the random number by a pseudo-random number calculation function having the range number n (here, n is a natural number) is included in the range of the random number by a pseudo-random number calculation function having the range number (n+1).

And in case of the above-mentioned equipment configuration, the determination function (309) performs:

(I) setting the biggest range number as p, and setting the big range number to the next as q;

(II) comparing a random number and a second number (number registered in the number-storage conversion table (305)) when the random number (the first number) generated by the pseudo-random number calculation function with the range number p exceeds a range thereof according to the pseudo-random number calculation function with a range number q, and determining the storage corresponding to the storage identification information (the storage ID) associated with the second number to be the arrangement destination of the target object data when those numbers are identical while generating a random number (first number) and redoing from the (I) when not identical; and (III) subtracting one from p and subtracting one from q when the random number that the pseudo-random number calculation function with the range number p generated is within the limits of the range of the random number according to pseudo-random number calculation function with the range number q, and as a result of the subtraction, repeating the (II) when q is not 0, while comparing with the second number the random number which the pseudo-random number calculation function with the range number 1 generated when q is 0, and determining the storage corresponding to the storage identification information (storage ID) related to the second number to be the arrangement destinations of the target object data when those numbers are identical, while generating a random number (first number) and redoing from the (I) when not identical.

When the maximum number among the numbers registered in the number-storage conversion table 305 is bigger than the biggest upper limit value among the upper limit value of the random number which the plural pseudo-random number calculation functions currently provided generate, a new pseudo-random number calculation function may be provided like aforementioned configuration.

Even when the storage which records an object data fluctuates like the first embodiment mentioned above, according to such second embodiment and its modification, it is realized that the each storage is arranged approximately uniformly (evenly) and efficiently with a small operation amount and the minimum movement of the object data.

Moreover, according to this embodiment and its modification, a realistic and efficient object data arrangement apparatus can be realized without being constrained by the assumed conditions in the first embodiment (that is, the number (second number) registered in the number-storage conversion table (105) is a value within a range of the random number generated by the pseudo-random number calculation function (103)).

That is, in the first embodiment, when the upper limit value by the pseudo-random number calculation function 103 is set too much more highly than the biggest number used in the number-storage conversion table 105, a possibility that the determination function 104 determines that the corresponding storage does not exist becomes high. In this case, because computing time becomes long, the equipment configuration which sets its upper limit value too much highly is not desirable by using the single pseudo-random number calculation function (103). In contrast, according to the second embodiment and its modification mentioned above, by using a plurality of pseudo-random number calculation functions with the upper limit value of the different random number, even when the upper limit value of the number (second number) used in the number-storage conversion table is high, reduction in computing time can be realized.

In each embodiment and the modification mentioned above, although it is desirable to arrange the object data uniformly that the size of the object data treated as one data is uniform, but not limited to this.

In each embodiment and the modification mentioned above, although it is desirable that the size of the storage treated as one storage is uniform, but not limited to this.

Further, when object data is taken apart by the treating unit, the metadata is hashed and the seed for the pseudo-random number calculation function is generated for every treating unit of the object data based on the hashed result.

In each embodiment and its modification mentioned above, it is assumed a mode that the storage decision function (102, 320) is provided with a function which generates only the quantity of the first numbers specified from the outside that are identical to the second numbers, storage identification information related with the second number that is identical with each generated first number by the reference of the number-storage conversion table (105, 305) is obtained, by using the storage decision function, in the process of the repeated generation of the new first number, and the same object is arranged to the obtained plural storages corresponding to the second numbers.

In each embodiment and its modification mentioned above, the pseudo-random number calculation function repeats generating a random number until the number (first number) corresponding to the storage as an arrangement destination is obtained. Therefore, in some cases, there is a possibility of taking time to determine the storage to which the object data should be arranged. Accordingly, when the number corresponding to the storage cannot be obtained even if the random number is generated only for a specified number of times, it is assumed a mode that some number is chosen from numbers with corresponding storages by using a random number in order to avoid such a situation.

As an additional modification, when the storage is determined, a mode using a table in which a metadata is associated with the storage is assumed. In this case, first, when the storage can be determined by referring to the table, an appropriate storage is determined. And when the storage cannot be determined by referring to the table, the storage should be determined by the arrangement processing according to each embodiment mentioned above. According to such a mode, an embodiment that an object data to access at high speed is arranged to a storage which operates at specifically high speed and the arrangement processing according to each embodiment mentioned above is applied for other object data can be realized.

As another additional modification, when an object data is recorded in a storage. it is considered a mode that the object data is recorded in the state of being divided into plural portions (partial object data). In that case, the each partial object data itself does not have a specific identifier. Accordingly, in case of such mode, the following processing may be added. That is, in the modification, it is considered a configuration that an identifier determined uniquely respectively is given to the each partial object data by calculating an identifier which the object data has by a calculation function of a hash. For example, a case that after an object data B with an identifier A is divided into three of partial object data (B1, B2, B3), it is stored in a storage is considered. In this case, simply for example, the specific identifier (sub information) of three of the partial object data may be given as follows, and their specific identifier may be adopted as the metadata in each embodiment mentioned above.

Partial file B1: Information added 0 to an identifier A,
Partial file B2: Information added 1 to an identifier A, and
Partial file B3: Information added 2 to an identifier A.

That is, in this modification, the hash operational function (101, 301) generates specific sub information for the each partial object based on one of specific information (identifier A) provided in the object data B and generates sequence information (hash) for each partial object based on the sub information. The storage decision function (102, 320) generates a first number by using the sequence information (hash) generated for each of the partial objects and compares a second number and the first number with reference to the number-storage conversion table (105, 305). And in response to the coincidence of those numbers, the storage decision function (102, 320) determines the storage corresponding to the storage identification information associated with the second number as an arrangement destination of the partial object.

As further another additional modification, there is a case where one object data would like to be multiplexed and recorded. In this case, the object data will be stored in a plurality of storages. Accordingly, in this modification, by generating a plurality of numbers (first numbers) by the storage decision function (102, 320), a plurality of storages which should store the object data can be determined. In that case, there is a possibility that plural numbers (second numbers) correspond to one storage in the number-storage conversion table (105, 305) for the reason for expressing the difference in the memory capacity of each storage. Therefore, when it is needed to store with a different storage, it may be checked that a plurality of numbers (first numbers) are the numbers corresponding to the different storage by using a table or an algorithm for determining the different number corresponding to the single storage.

As further modification, there is a case that the data protection would like to be performed according to RAIDS between different storages, for example. Accordingly, in this modification, the storage is determined by generating numbers until the generated numbers (first numbers) generated by the storage decision function (102, 320) are different reciprocally so that a plurality of related object data is stored in the mutually different storages. In that case, there is a possibility that plural numbers (second numbers) correspond to one storage in the number-storage conversion table (105, 305) for the reason for expressing the difference in the memory capacity of the storage. Therefore, when they are needed to be stored in different storages, it may be checked that the numbers (first numbers) generated with the storage decision function (102, 320) are the numbers corresponding to the different storages to the related object data by using a table or an algorithm for determining different numbers corresponding to a single storage. According to such a mode, by restricting combination of the numbers (the first numbers) generated by the storage decision function (102, 320), the related plural object data can be distributed and arranged in the different storages.

By the way, in each embodiment and its modification mentioned above, the storage which records the data was assumed as the arrangement destination of the object data. And it was assumed that the object data constituted at least one of the digital data and the software program describing the specified processing (a process, a function, an algorithm). However, the scope of the present invention which was explained as an example on the each embodiment and its modification is not limited to the each embodiment and its modification. Specifically, for example, it is assumed that the object is a processing (such as an order, a process, a function, a program code and an algorithm). And in this case, an arrangement destination of the object is an operation execution environment (a processing execution environment) of a processor and an IP core (Intellectual Property Core) or the like where the processing is performed. For example, in the case of the embodiment which applies the present invention to an operation execution environment that is an arrangement destination, processing efficiency such as load sharing (load balancing) or the like between plural servers can be improved.

Moreover, the scope of the present invention can be applied to an article such as a luggage, as an object which exists physically, as it is clear from a third embodiment described below.

Third Exemplary Embodiment

Hereinafter, a third exemplary embodiment of the present invention will be described with reference to FIG. 13 to FIG. 15.

Figure 13:
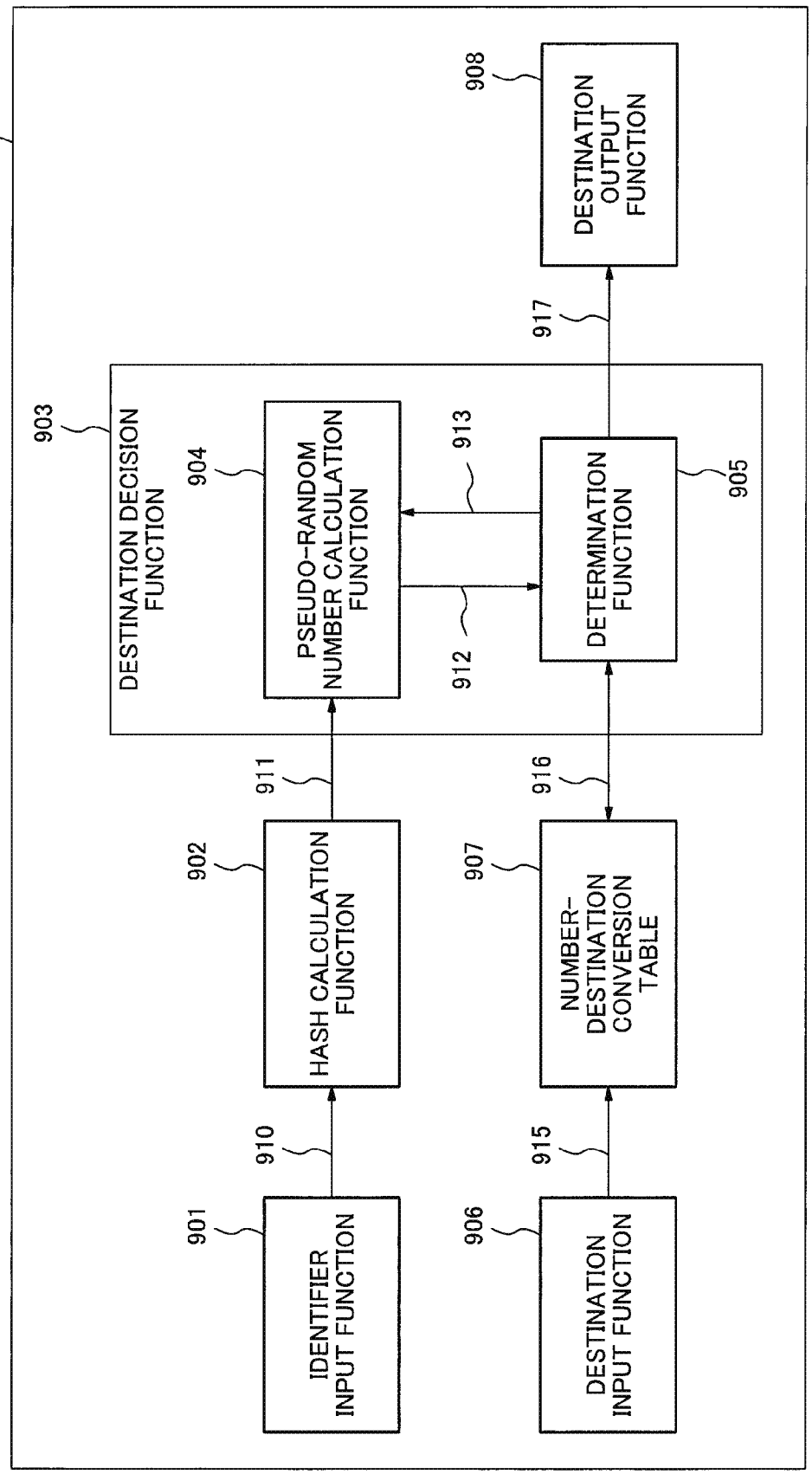
FIG. 13 is a block diagram showing a configuration of an object destination decision apparatus according to a third exemplary embodiment of the present invention.

FIG. 13 is a block diagram showing a configuration of an object destination decision apparatus according to a third exemplary embodiment of the present invention.

In this embodiment, an object destination decision apparatus 900 (hereinafter, called as "apparatus 900" for abbreviation), according to an identifier of an object (an article such as a luggage) which determines a destination (address) therefore being inputted, determines the destination of the object.

The apparatus 900 outputs a same destination to the same identifier in the state that the same destination is registered. The apparatus 900 outputs all destinations by an approximately same probability to the identifier of the object. When a destination is added, or when a destination is eliminated, the apparatus 900 maintains the characteristic to output all destinations by an approximately same probability to the identifier of the object. According to such apparatus 900, even when the destination must be changed in accordance with addition or elimination of the destination, the object which should change the destination can be minimized.

Hereinafter, the object destination decision apparatus 900 will be described in detail. The apparatus 900, in a broad sense, includes an identifier input function 901, a hash operational function 902, a destination decision function 903, a destination input function 906, a number-destination conversion table 907 and a destination output function 908. The destination decision function 903 includes a pseudo-random number calculation function 904 and a determination function 905.

The identifier input function 901 is able to obtain an identifier for identifying an object from outside. The identifier input function 901 provides an acquired identifier to the hash operational function 902 as an identifier 910. Here, the identifier 910 is object-unique information. As the identifier input function 901, a user interface (man-machine interface) such as a keyboard and a mouse, or an image processing apparatus which analyzes an input image representing such a barcode, a zip code or a dispatch number is assumed. And the identifier input function 901 may be a communication interface which acquires an identifier from an external apparatus via a signal line.

The apparatus 900 outputs the same destination to the same identifier. Therefore, when needed to get a different destination, a different identifier needs to be set to the apparatus 900.

A hash operational function 902 outputs a hash 911 by carrying out a hash operation based on the identifier 910, for the hash operation, an operation of outputting the identifier 910 as it is, or an operation of outputting after processing is employable. The hash 911 is an example of sequence information generated based on information (identifier 910) specific to the object data.

The destination decision function 903 as an arrangement destination decision function outputs destination information 917 of an object based on the hash 911 obtained from the hash operational function 902 and information 916 obtained from the number-destination conversion table 907.

The pseudo-random number calculation function 904 generates a random number (first number) using the hash 911 as a seed (an initial value). The pseudo-random number calculation function 904 sends the generated random number as a random number 912 to the determination function 905. As an algorithm which should be adopted for the pseudo-random number calculation function 904 to generate a pseudo-random number when the seed is the same, an arbitrary algorithm is employable, if it is the algorithm which generates the same sequence with low correlativity to a sequence of a different seed. However, as mentioned above in the first embodiment, the algorithm which generates a uniform random number is desirable.

The determination function 905 determines whether or not the number (second number) that is identical with the random number 912 exists in the number-destination conversion table 907 based on the random number 912 obtained from the pseudo-random number calculation function 904 and the information 916 in the number-destination conversion table 907. As a result of this determination, when the number that is identical with the random number 912 exists, the determination function 905 outputs its number as destination information 917 representing a destination of a noted object. On the other hand, when the number that is identical with the random number 912 does not exist, the determination function 905 orders to generate a next random number 912 by issuing a re-calculation order 913 to the pseudo-random number calculation function 904.

According to acquiring destination information, a destination addition instruction and a destination delete instruction from the outside, the destination input function 906 sends those information and instructs to the number-destination conversion table 907 as a destination change instruction 915. As the destination input function 906, for example, a user interface (a man-machine interface) such as a keyboard and a mouse, and a communication interface which acquires information and an order from an external apparatus via a signal line are assumed.

The number (second number) and the destination information (the destination identifier) are associated and registered in the number-destination conversion table 907. The same data structure as the number-storage conversion table (FIG. 10A and FIG. 10B) in the first exemplary embodiment can be applied as the number-destination conversion table 907.

The number-destination conversion table 907 is set up or updated from the outside of the apparatus 900 in a suitable timing (the apparatus 900 may generate itself).

That is, by the destination change instruction 915, the destination addition order may be sent from the destination input function 906. In this case, destination information representing a destination to add is included in the destination change instruction 915. The corresponding number (second number) is assigned newly to the number-destination conversion table 907, and the number thereof and the destination information included in the destination change instruction 915 are associated and registered therein.

Or, by the destination change instruction 915, the destination delete instruction may be sent from the destination input function 906. In this case, destination information representing a destination which should be eliminated is included in the destination change instruction 915. And the destination information which is identical with the destination information included in the delete order and the number (second number) corresponding to that are eliminated from the number-destination conversion table 907. Further, when an addition instruction for a destination is sent newly, the number that eliminated the correspondence with the destination may be reused as the number corresponding to the destination included in the addition instruction.

Or, by the destination change instruction 915, a change instruction for a destination may be sent from the destination input function 906. In this case, the destination information representing a destination before change and the destination information representing a destination after change are included in the destination change instruction 915. And the destination registered in the number-destination conversion table 907 is changed using the destination information before and after change included in the destination change instruction. Further, destination information does not need to correspond to a destination one-on-one. That is, identical destination information may be associated with the number-destination conversion table 907 to a plurality of numbers (second numbers). Or, the identical number (second number) may indicate a plurality of destinations as a group.

The destination output function 908 outputs a destination of an object to a target using the apparatus 900. A mode of the destination output function 908 depends on a target using the apparatus 900.

Next, a processing of the object destination decision apparatus 900 according to this exemplary embodiment will be described.

Figure 14:
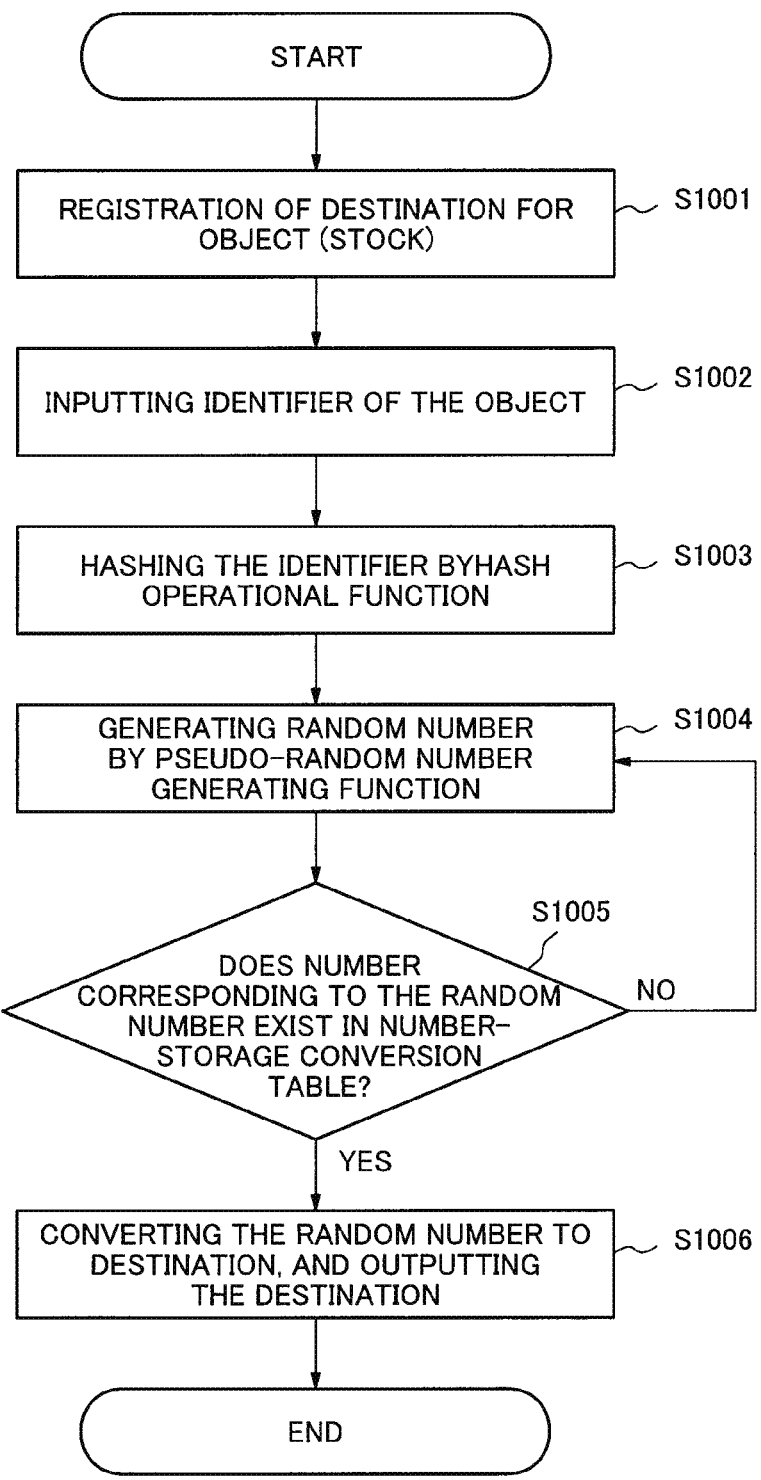
FIG. 14 is a flowchart showing a destination decision processing of an object which the object destination decision apparatus according to the third exemplary embodiment of the present invention performs.

FIG. 14 is a flowchart showing a destination decision processing of an object which the object destination decision apparatus according to the third exemplary embodiment of the present invention performs. Here, when the apparatus 900 is realized by a computer, a CPU (Central Processing Unit) of the computer will execute processing of each step described below (detail will be described later with reference to FIG. 16 and FIG. 17).

Step S1001: First, as preliminary preparations, the destination input function 906 receives information on a destination and sends the information to the number-destination conversion table 907 as the destination change instruction 915. In the number-destination conversion table 907, the number corresponding to each destination is given, and a corresponding relationship between the number and the destination information is recorded. The information on the destination to record needs to be the information that a target which receives an output of the apparatus 900 can determine the destination of the object.

Step S1002: The identifier input function 901 obtains the identifier of the object which should determine a destination in response to a decision processing of the destination being started, and sends the acquired identifier to the hash operational function 902 as the identifier 910.

Step S1003: The hash operational function 902 gets the hash 911 by hash calculation based on the identifier 910. As an operation by the hash operational function 902, various operations such as outputting the identifier 910 as it is, or calculating with a hash function can be considered. The hash 911 is sent to the pseudo-random number calculation function 904 and it becomes a seed (an initial value) of a random number.

Step S1004: The pseudo-random number calculation function 904 generates the random number 912 using the hash 911 as the seed.

The determination function 905 determines whether destination information which is associated with the number that is identical with the random number 912 exists, by referring to the number-destination conversion table 907. When the number that is identical with the random number 912 does not exist, the processing is returned to Step S1004. In this case, the pseudo-random number calculation function 904 generates a next random number (912).

Step S1006: When the number that is identical with the random number 912 exists, the determination function 905 sends the destination information acquired by referring to the number-destination conversion table 907 as destination information 917 to the destination output function 908. The destination output function 908 outputs a destination of an object to a target using the apparatus 900. The destination output function 908 depends on a target using the apparatus 900.

Next, a storage destination decision system of a stock (baggage) using the object destination decision apparatus 900 mentioned above will be described.

Figure 15:
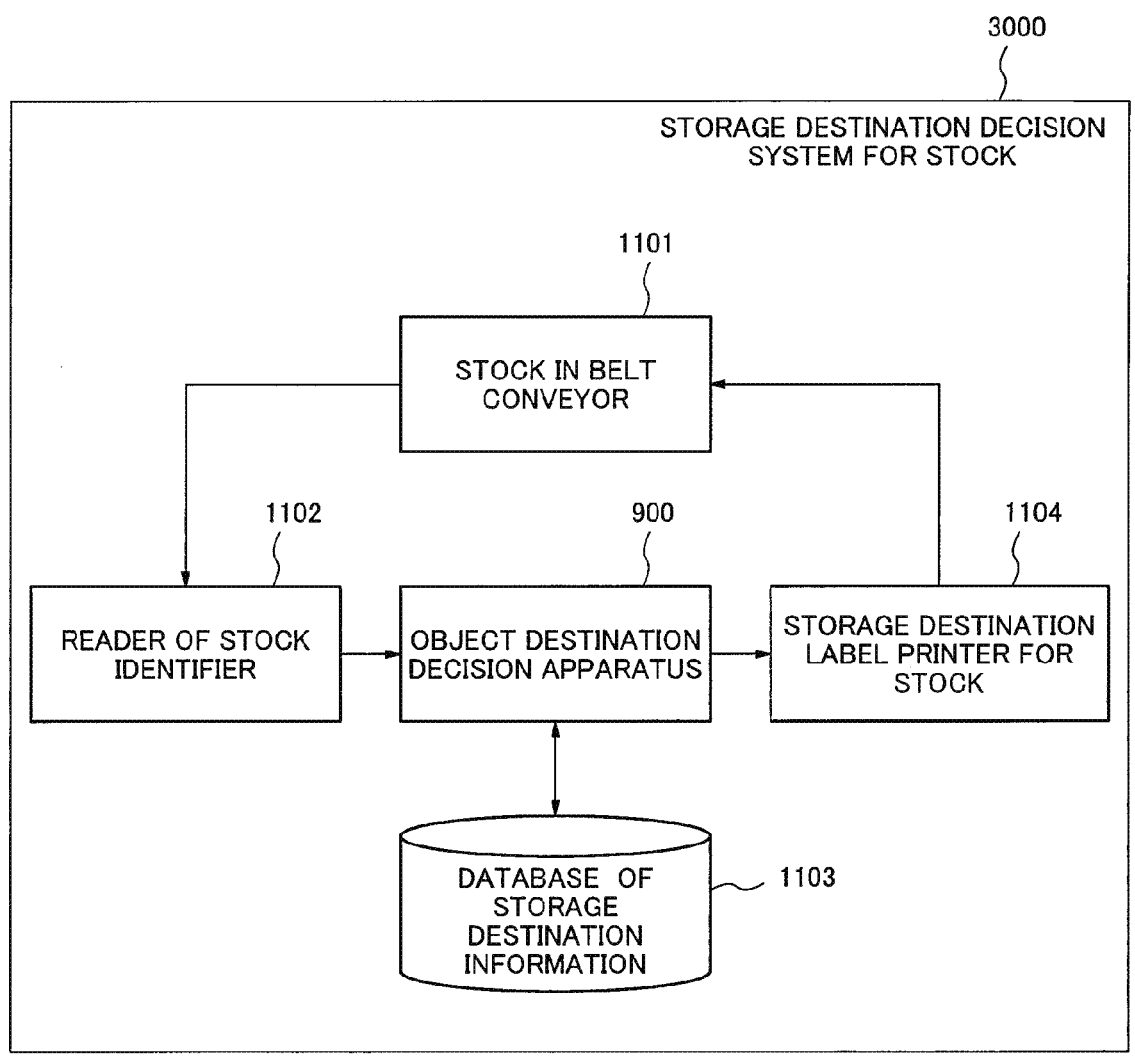
FIG. 15 is a block diagram showing a configuration of a storage destination decision system of a stock according to the third exemplary embodiment of the present invention.

FIG. 15 is a block diagram showing a configuration of a storage destination decision system of a stock according to the third exemplary embodiment of the present invention. A storage destination decision system 3000 of a stock includes a stock 1101 in a belt conveyor, a stock identifier reader 1102, storage destination information database 1103, a storage destination label printer 1104 for a stock and an object destination decision apparatus 900.

The stock identifier reader 1102 is an apparatus which reads a specific identifier (a barcode, a zip code or a dispatch number) which was given to a stock (a luggage) 1101 which flows in a belt conveyor by an optical scan and an image processing. The stock identifier reader 1102 sets a read identifier to the apparatus 900 (identifier input function 901). In the following description, the stock 1101 which becomes a processing object is called a noted stock.

Information (storage destination information) representing a plurality of storages destinations with a possibility that a stock (luggage) which the storage destination decision system 3000 handles is stored is stored in the storage destination information database 1103 in advance. By referring to the storage destination information database 1103, the apparatus 900 (destination input function 906) acquires storage destination information (destination) corresponding to the identifier.

By a procedure mentioned above with reference to FIG. 14, the object destination decision apparatus 900 (the destination decision function 903) determines a storage destination (destination) of the noted stock based on the identifier of a noted stock and information 916 obtained from a number-destination conversion table 907. Here, the identifier of the target stock is information obtained from the stock identifier reader 1102. The information 916 obtained from the number-destination conversion table 907 is information which is obtained from the number-destination conversion table 907 updated by storage destination information from the storage destination information database 1103 appropriately.

According to the destination information (storage destination information) acquired from the apparatus 900 (the destination output function 908), the storage destination label printer 1104 is an apparatus which prints a storage destination to a noted stock which is the stock 1101 which flows in the belt conveyor.

By the system configuration mentioned above, according to the storage destination decision system 3000, it is possible to determine a storage destination (destination) of the stock based on an identifier of a stock (target stock) which flows in the belt conveyor, and print a label representing a determined storage destination in the stock.

Fourth Exemplary Embodiment

Next, the system environment (the hardware environment) that an object arrangement apparatus (object destination decision apparatus) mentioned above in the first to the third embodiments is carried out will be described with reference to FIG. 16A and FIG. 16B.

As mentioned above, the apparatus in each embodiment can be realized by a computer. In this case, the function of the apparatus is realized by a CPU of a computer executing a software program. However, in the system environment that a plurality of storages (a storage group) is used, various variations are assumed at the place which sets up the function of the apparatus.

Figure 16A:
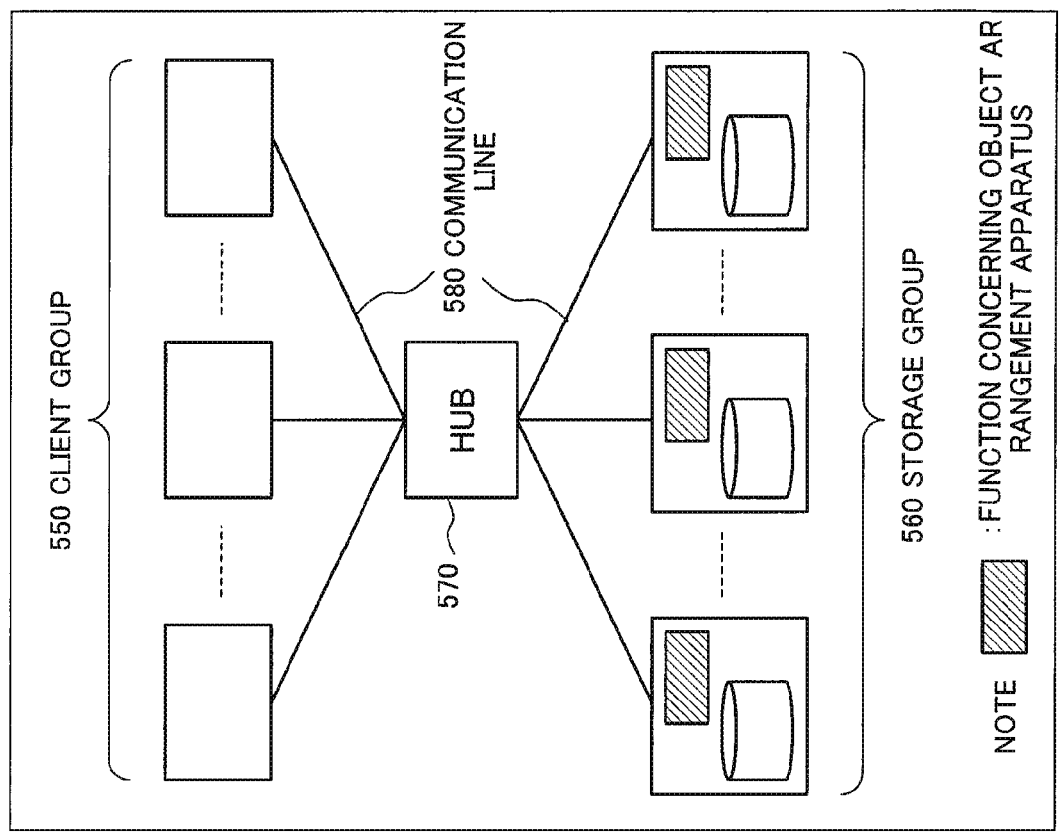
FIG. 16A is a chart illustrating exemplarily a variation of a system environment according to a fourth exemplary embodiment of the present invention.
Figure 16B:
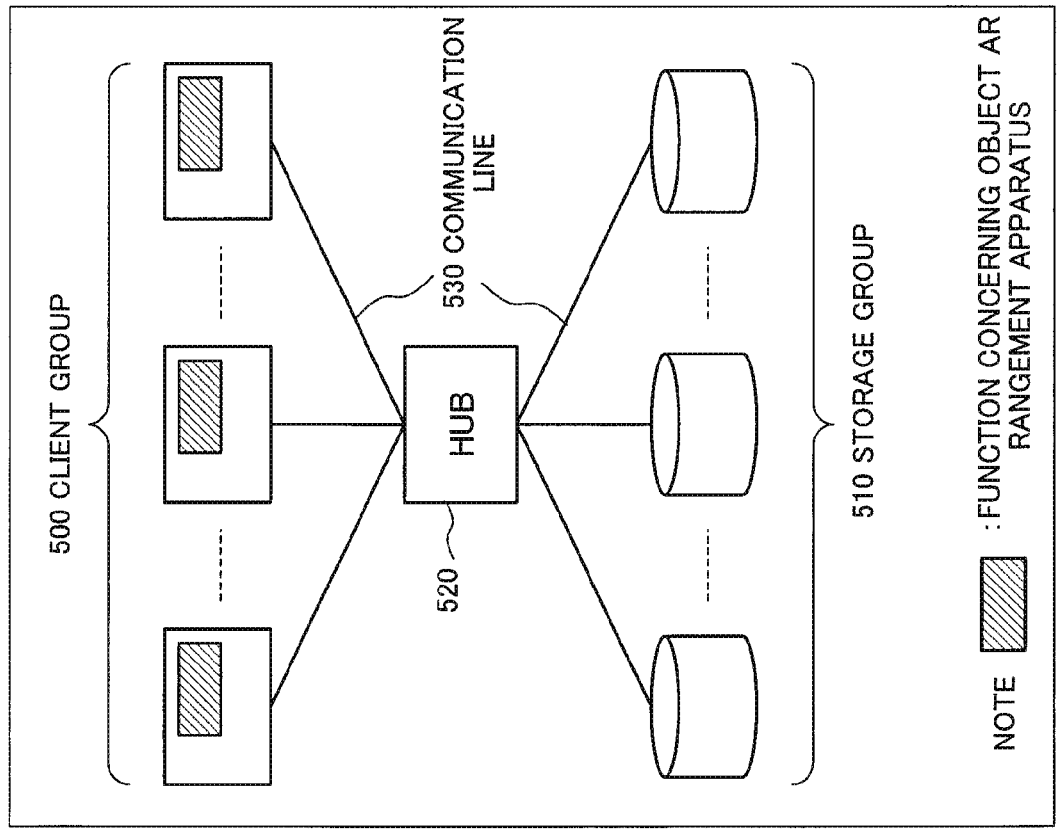
FIG. 16B is a chart illustrating exemplarily a variation of a system environment according to a fourth exemplary embodiment of the present invention.

FIGS. 16A and 16B are charts illustrating exemplarily a variation of a system environment according to a fourth exemplary embodiment of the present invention.

In an example shown in FIG. 16A, a client group 500 including a plurality of clients and a storage group 510 including a plurality of storages are connected by a communication line 530 via a hub (HUB) 520. And in this example, the function of the object arrangement apparatus (object destination decision apparatus) is set up in a client group 500 as shown in FIG. 16A by a slanted line.

On the other hand, in an example shown in FIG. 16B, a client group 550 including a plurality of clients and a storage group 560 including a plurality of storages are connected by a communication line 580 via a hub (HUB) 570. And in this example, the function of the object arrangement apparatus (object destination decision apparatus) is set up in a storage group 560 as shown in FIG. 16B by a slanted line.

The storage groups 510 and 560 may be constituted by plural storages physically, plural virtual storages provided in a single storage, or their combination.

Thus, when realizing the object arrangement apparatus (object destination decision apparatus) described in the first to the third embodiments, the environment carried out can be selected flexibly.

And the each function that was shown in the drawing in the each embodiment mentioned above can be recognized to be a functional unit (software module) of the software program. An example of the hardware environment of this case will be described with reference to FIG. 17.

Figure 17:
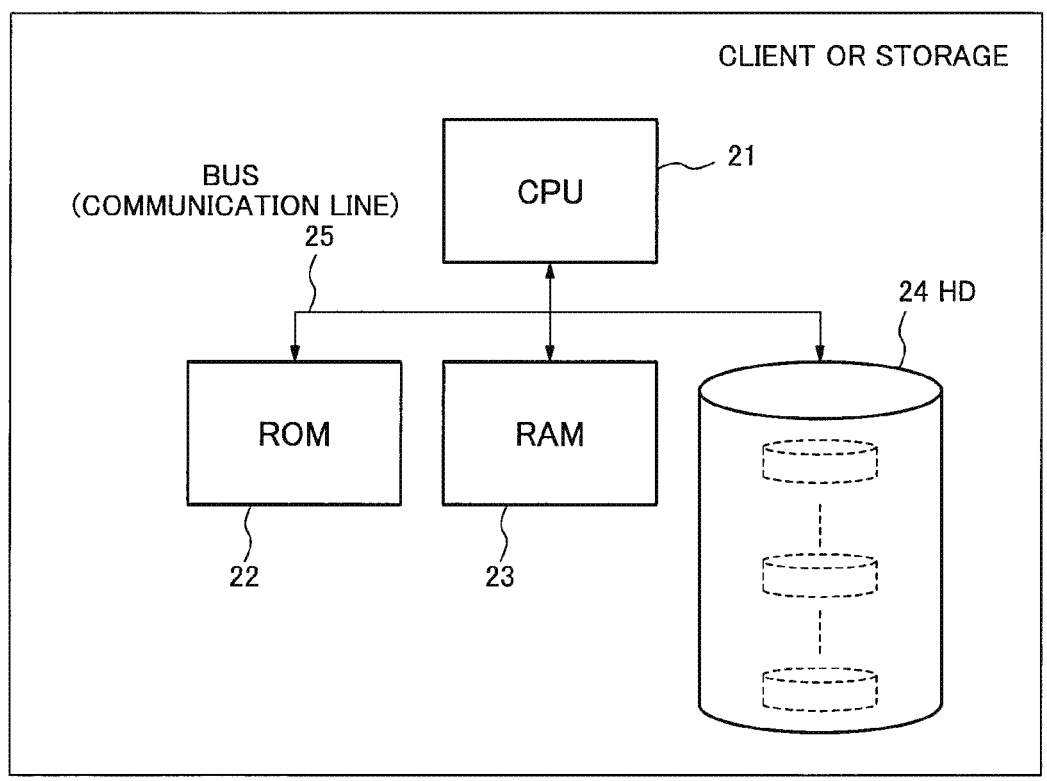
FIG. 17 is a chart illustrating exemplarily a hardware configuration of a client or a storage according to the fourth exemplary embodiment of the present invention.

FIG. 17 is a chart illustrating exemplarily a hardware configuration of a client or a storage according to the fourth exemplary embodiment of the present invention. That is, FIG. 17 is a configuration of the computer which can realize a storage or a client shown in FIG. 16 and represents the hardware environment that the each function in the each embodiment described above can be realized.

The hardware shown in FIG. 17 includes a CPU 21, an ROM (Read Only Memory) 22, an RAM (Random Access Memory) 23 and a hard disk (storage apparatus) 24, and these configuration is a general computer connected via a bus (communication line) 25. It is assumed a case that the hard disk 24 by itself functions as a storage in the exemplary embodiment mentioned above, when the hardware is a storage.

And the present invention explained in the each embodiment mentioned above as an exemplary example can be realized by reading the computer program to the CPU 21 of the hardware concerned, and by executing it, after supplying the computer program, to the hardware shown in FIG. 17, which can realize the function of the block configuration drawings (FIG. 2, FIG. 4, FIG. 13) or the flow chart (FIG. 3, FIG. 5, FIG. 14) referred to in the explanation of the each embodiment. The computer program supplied in the apparatus may be stored in a storage device such as a memory (22) or a hard disk apparatus (24) which can be read and written.

In the case mentioned above, as the method of supplying the computer program in the hardware, a present general procedure such as a method of installing in the apparatus via various recording media such as a CD-ROM, a method of downloading from the outside via communication lines such as the Internet, etc. are employable. And in such case, the present invention is configured by cords representing the computer program or a storage medium storing the computer program.

However, the object arrangement apparatus (object destination decision apparatus) mentioned above in the first to the third embodiment may be realized by an exclusive hardware.

The present invention has been described as the exemplary embodiments mentioned above and an example applied to the modification thereof. However, the technical scope of the present invention is not limited to the range that was indicated in the each embodiment mentioned above. It is apparent to be able to add various change or improvement for a person skilled in the art to the embodiments. In such case, the new embodiment that has added the change or improvement can also be included in the technical scope of the present invention. And this is obvious from the matter described in the claim. That is, in the scope of the present invention, the present invention is able to apply various modes which a person skilled in the art can understand.

This application is based upon and claims the benefit of priority from Japanese patent application No. 2010-184109, filed on Aug. 19, 2010, the disclosure of which is incorporated herein in its entirety by reference.

DESCRIPTION OF THE REFERENCE NUMERALS 10 object arrangement apparatus
11 sequence information based on peculiar information of object
12 corresponding information
13 arrangement destination decision function
14 arrangement destination
21 CPU
22 ROM
23 RAM
24 hard disk (storage apparatus)
25 bus (communication line)
101, 301, 902 hash operational function
102, 320 storage decision function
103, 904 pseudo-random number calculation function
104, 309, 905 determination function
105, 305 number-storage conversion table
110, 310 metadata
111, 311, 612, 911 hash
112 random number (pseudo-random number)
113, 913 re-calculation signal (re-calculation instruction)
114 information obtained from number-storage conversion table
115, 319 storage information
116, 330 storage.
302 first pseudo-random number calculation function (A)
306 second pseudo-random number calculation function (B)
312 random number A.
315 random number B 600 system to determine correspondence with already-known data and storage based on metadata
601 hash operation function
602 modular operational function
603 number-storage corresponding determination function
610 object data and its metadata
611 metadata.
613 connection storage information.
614 result of modular operation
620 storage
900 object destination decision apparatus
901 identifier input function
903 destination decision function
907 number-destination conversion table
908 destination output function
910 identifier
915 destination alteration instruction
916 information obtained from number-destination conversion table 907
917 destination information
1000, 2000 object data arrangement apparatus
1101 stock in belt conveyor
1102 stock identifier reader
1103 storage destination information database (DB)
1104 storage destination label printer of stock
3000 storage destination decision system of stock

What is claimed is:

1. An object arrangement apparatus comprising at least one processor configured to implement an arrangement destination determination unit, the arrangement destination determination unit configured to refer to sequence information generated based on unique information for objects and to refer to corresponding information between arrangement destination identifiers identifying arrangement destinations of the objects and second numbers associated with the arrangement destination identifiers, the arrangement destination determination unit further configured to generate first numbers by using the sequence information, the first numbers not having a correlation therebetween when the first numbers are generated with different sequence information, and to repeatedly generate a new first number until the first number matches a second number contained in the corresponding information, and the arrangement destination determination means unit determines, when the first number matches any of the second numbers, to arrange the object to an arrangement destination corresponding to the arrangement destination identifier related to the matched second number, wherein the range of the second numbers is included in the range of the first numbers, and wherein the arrangement destination determination unit includes:

a number creating unit configured to:
generate the first number repeatedly by using the sequence information,
to generate a same number sequence based on same information,
to generate plural kinds of number sequences having mutually different ranges of numbers, and
to set the generated number as the first number, when a number included in a range of numbers of a target number sequence is included in a range of numbers of another number sequence having a different range of numbers from the range of numbers of the target number sequence and (i) a number of the target number sequence included in the range of numbers of the other number sequence and (ii) a number of the other number sequence included in the range of numbers of the target number sequence appear in a same order in both the target number sequence and the other number sequence, and a decision unit configured to compare the second number and the first number with reference to the corresponding information and to determine, in response to a coincidence of those numbers, an arrangement destination corresponding to the arrangement destination identifier associated with the second number as an arrangement destination of the object.

2. The object arrangement apparatus according to claim 1, wherein
the number creating unit includes a plurality of number creating units having mutually different ranges of numbers generable as the first numbers therebetween and having a relation that the range of numbers by one of the number creating unit with a range number n (n: a natural number) is included in a range of numbers by other of the number creating unit with a range number (n+1), and
by the decision unit:
(I) a biggest range number is set to p and a big range number to the next thereof is set to q,
(II) the first number is compared with the second number when the first number that the number creating unit with the range number p generated exceeds the range by the number creating unit with the range number q, an arrangement destination corresponding to the arrangement destination identifier related to the second number is determined as an arrangement destination of the object when those numbers are identical, and, when those numbers are not identical, generating of the new first number, the (I) and (II) are repeated, and
(III) when the first number that the number creating unit with range number p generated is within the range by the number creating unit with the range number q, one is subtracted from p and q, respectively, and as a result of the subtraction, the (II) is repeated when q is not 0, and the first number that the number creating unit with the range number 1 generated is compared with the second number when q is 0, and the arrangement destination corresponding to the arrangement destination identifier related to the second number is determined as an arrangement destination of the object when those numbers are identical, and not identical, the first number is generated and the processing is redone from the (I).

3. The object arrangement apparatus according to claim 2, wherein the number creating unit executes the plurality of the number creating units simultaneously.

4. The object arrangement apparatus according to claim 1, wherein
the number creating unit includes a function of generating a first number that is identical with the second number of specified quantity from outside in generating the new first number repeatedly, and
the decision unit obtains an arrangement destination identifier related to the second number that is accord with each generated first number by referring to the corresponding information and determines to arrange the same object at arrangement destinations corresponding to the obtained second numbers.

5. The object arrangement apparatus according to claim 1, wherein the decision unit is capable of referring to a plurality of corresponding information as the corresponding information, and determines, based on information of the object, an arrangement destination of the object by referring to corresponding information corresponding to the information thereof among the plurality of corresponding information.

6. The object arrangement apparatus according to claim 5, wherein the decision unit selects any of corresponding information among the plurality of corresponding information as a reference target according to a protective level requested for the object.

7. The object arrangement apparatus according to claim 1, further comprising a sequence information generation unit to generate for generating the sequence information.

8. The object arrangement apparatus according to claim 7, wherein the decision unit determine to distribute and arrange the related plurality of objects to different storage locations by restricting a combination of the second numbers.

9. The object arrangement apparatus according to claim 8, wherein
in case that the object is constituted by a plurality of partial objects and has one of the unique information, the sequence information generation unit includes a unit to generate specific sub information for the each partial object based on the one of the unique information, and to generate for generating sequence information for the each partial object based on the sub information,
the number creating unit generates the first number by using the sequence information generated for the each partial object, and
the decision unit compares the second number and the first number with reference to the corresponding information, and determines, in accordance with those numbers being identical, an arrangement destination corresponding to an arrangement destination identifier associated with the second number as an arrangement destination of the partial object.

10. The object arrangement apparatus according to claim 1, wherein the number creating unit is a pseudo-random number calculating unit to generate a pseudo-random number with reproducibility by executing a specified calculation.

11. The object arrangement apparatus according to claim 10 further comprising a hash operation unit to perform for performing a hash operation based on the unique information as the sequence information,
wherein the pseudo-random number calculating unit generates the pseudo-random number by using a hash value calculated by the hash operating unit as an initial value.

12. The object arrangement apparatus according to claim 1, wherein
the object is a processing, and
the decision unit determines an arrangement destination where the processing is performed.

13. The object arrangement apparatus according to claim 1, wherein
the arrangement destination is a storage, and
the object is an object data constituting at least any one of digital data stored in the storage and a software program described a specified processing.

14. The object arrangement apparatus according to claim 1, wherein
the object is an article, and
the article is determined to be distributed to an arrangement destination which was determined by the decision unit.

15. An object arranging method comprising:
referring to sequence information generated based on unique information for objects, and referring to corresponding information between arrangement destination identifiers for identifying the arrangement destinations of the objects and second numbers associated with the arrangement destination identifiers;

generating first numbers by using the sequence information, the first numbers not having a correlation therebetween when the first numbers are generated with different sequence information;

generating a new first number repeatedly until the first number matches the second number contained in the corresponding information; and determining, when the first number matches any of the second numbers, to arrange the object to an arrangement destination corresponding to the arrangement destination identifier related to the matched second number, wherein a range of the second numbers is included in a range of the first numbers, wherein the generating first numbers comprises:

the first number being repeatedly generated by using the sequence information, generating a same number sequence based on same information and generating a plural kinds of number sequences having mutually different ranges of numbers, and setting the generated number as the first number, when a number included in a range of numbers of a target number sequence is included in a range of numbers of other number sequence having a different range of numbers from the range of numbers of the target number sequence and (i) a number of the target number sequence included in the range of numbers of the other number sequence and (ii) a number of the other number sequence included in the range of numbers of the target number sequence appear in a same order in both the target number sequence and the other number sequence, and wherein the determining comprises:

comparing the second number and the first number with reference to the corresponding information and determine, in response to a coincidence of those numbers, an arrangement destination corresponding to the arrangement destination identifier associated with the second number as an arrangement destination of the object.

16. The object arranging method according to claim 15, wherein by using a plurality of number creating units, which generate the first numbers, having mutually different ranges of the numbers generable as the first numbers therebetween and having a relation that the range of numbers according to one of the number creating unit with a range number n (n: a natural number) is included in a range of numbers according to other of the number creating unit with a range number (n+1), and wherein (I) a biggest range number is set to p and set a range number big next to q, (II) the first number and the second number are compared when the first number that the number creating unit with the range number p generated exceeds the range according to the number creating unit with the range number q, an arrangement destination corresponding to the arrangement destination identifier related to the second number is determined as an arrangement destination of the object when those numbers are identical and, when those numbers are not identical, generating of the new first number, the (I) and (II) are repeated, and (III) when the first number that the number creating unit with range number p generated is within the range by the number creating unit with the range number q, one is subtracted from p and q, respectively, and as a result of the subtraction, the (II) is repeated when q is not 0, and the first number that the number creating unit with the range number 1 generated is compared with the second number when q is 0, and the arrangement destination corresponding to the arrangement destination identifier related to the second number is determined as an arrangement destination of the object when those numbers are identical, and not identical, the first number is generated and the processing is redone from the (I).

17. A non-transitory computer-readable media storing a computer program causing a computer to execute an arrangement destination decision function, wherein the arrangement destination decision function generates first numbers by using the sequence information, the first numbers not having a correlation therebetween when the first numbers are generated with different sequence information, and repeats generating a new first number until the first number matches the second number contained in the corresponding information, the arrangement destination determination function determines, when the first number matches any of the second numbers, to arrange the object to an arrangement destination corresponding to the arrangement destination identifier related to the matched second number, a range of the second numbers is included in a range of the first numbers, and the arrangement destination determination function comprises:

a number creating function capable of generating the first number repeatedly by using the sequence information, the number creating function generates a same number sequence based on same information and is capable of generating a plural kinds of number sequences having mutually different ranges of numbers, and the number creating function sets the generated number as the first number, when a number included in a range of numbers of a target number sequence is included in a range of numbers of other number sequence having a different range of numbers from the range of numbers of the target number sequence and (i) a number of the target number sequence included in the range of numbers of the other number sequence and (ii) number of the other number sequence included in the range of numbers of the target number sequence appear in a same order in both the target number sequence and the other number sequence, and a decision function to compare the second number and the first number with reference to the corresponding information and determine, in response to a coincidence of those numbers, an arrangement destination corresponding to the arrangement destination identifier associated with the second number as an arrangement destination of the object.

18. The non-transitory computer-readable media storing the computer program according to claim 17, wherein the number creating function includes a plurality of number creating functions having mutually different ranges of numbers generable as the first numbers therebetween and having a relation that the range of numbers by one of the number creating function with a range number n (n:

a natural number) is included in a range of numbers by other of the number creating function with a range number (n+1), and by the decision function:
- (I) a biggest range number is set to p and a big range number to the next thereof is set to q,
- (II) the first number is compared with the second number when the first number that the number creating function with the range number p generated exceeds the range by the number creating function with the range number q, an arrangement destination corresponding to the arrangement destination identifier related to the second number is determined as an arrangement destination of the object when those numbers are identical, and, when those numbers are not identical, generating of the new first number, the (I) and (II) are repeated, and
- (III) when the first number that the number creating function with range number p generated is within the range by the number creating function with the range number q, one is subtracted from p and q, respectively, and as a result of the subtraction, the (II) is repeated when q is not 0, and the first number that the number creating function with the range number 1 generated is compared with the second number when q is 0, and the arrangement destination corresponding to the arrangement destination corresponding to the arrangement destination identifier related to the second number is determined as an arrangement destination of the object when those numbers are identical, and not identical, the first number is generated and the processing is redone from the (I).

19. An object arrangement apparatus comprising at least one processor configured to implement an arrangement destination determination means, the arrangement destination determination means refers to sequence information generated based on unique information for objects and refers to corresponding information between arrangement destination identifiers identifying arrangement destinations of the objects and second numbers associated with the arrangement destination identifiers, the arrangement destination determination means generates first numbers by using the sequence information, the first numbers not having a correlation therebetween when the first numbers are generated with different sequence information, and repeats generating anew first number until the first number matches the second number contained in the corresponding information, and the arrangement destination determination means determines, when the first number matches any of the second numbers, to arrange the object to an arrangement destination corresponding to the arrangement destination identifier related to the matched second number, wherein the range of the second numbers is included in the range of the first numbers, and wherein the arrangement destination determination means comprises:
- number creating means capable of generating the first number repeatedly by using the sequence information, the number creating means generating a same number sequence based on same information and is capable of generating a plural kinds of number sequences having mutually different ranges of numbers, and the number creating means sets the generated number as the first number, when a number included in a range of numbers of a target number sequence is included in a range of numbers of other number sequence having a different range of numbers from the range of numbers of the target number sequence and (i) a number of the target number sequence included in the range of numbers of the other number sequence and (ii) number of the other number sequence included in the range of numbers of the target number sequence appear in a same order in both the target number sequence and the other number sequence, and
- decision means to comparing the second number and the first number with reference to the corresponding information and determine in response to a coincidence of those numbers, an arrangement destination corresponding to the arrangement destination identifier associated with the second number as an arrangement destination of the object.

20. An object arrangement apparatus comprising at least one processor configured to implement an arrangement destination determination unit, wherein
the arrangement destination determination unit refers to sequence information generated based on unique information for objects and refers to corresponding information between arrangement destination identifiers identifying arrangement destinations of the objects and second numbers associated with the arrangement destination identifiers, the arrangement destination determination unit generates first numbers by using the sequence information, the first numbers not having a correlation therebetween when the first numbers are generated with different sequence information, and repeats generating a new first number until the first number matches a second number contained in the corresponding information, the arrangement destination determination unit determines, when the first number matches any of the second numbers, to arrange the object to an arrangement destination corresponding to the arrangement destination identifier related to the matched second number, wherein the arrangement destination determination unit includes:
- a number creating unit to generate the first number repeatedly; and
- a decision unit to compare the second number and the first number with reference to the corresponding information and determine, in response to a coincidence of those numbers, an arrangement destination corresponding to the arrangement destination identifier associated with the second number as an arrangement destination of the object, and wherein
the number creating unit includes a plurality of number creating units having mutually different ranges of numbers generable as the first numbers therebetween and having a relation that the range of numbers by one of the number creating unit with a range number n (n: a natural number) is included in a range of numbers by other of the number creating unit with a range number (n+1), and by the decision unit:
- (I) a biggest range number is set to p and a big range number to the next thereof is set to q,
- (II) the first number is compared with the second number when the first number that the number creating unit with the range number p generated exceeds the range by the number creating unit with the range number q, an arrangement destination corresponding to the arrangement destination identifier related to the second number is determined as an arrangement destination of the object when those numbers are identical, and, when those numbers are not identical, generating of the new first number, the (I) and (II) are repeated, and (III) when the first number that the number creating unit with range number p generated is within the range by the number creating unit with the range number q, one is subtracted from p and q, respectively, and as a result of the subtraction, the (II) is repeated when q is not 0, and the first number that the number creating unit with the range number 1 generated is compared with the second number when q is 0, and the arrangement destination corresponding to the arrangement destination corresponding to the arrangement destination identifier related to the second number is determined as an arrangement destination of the object when those numbers are identical, and not identical, the first number is generated and the processing is redone from the (I).

21. The object arrangement apparatus according to claim 20, wherein the number creating unit executes a plurality of the number creating units simultaneously.

22. An object arranging method comprising:
referring to sequence information generated based on unique information for objects, and referring to corresponding information between arrangement destination identifiers for identifying the arrangement destinations of the objects and second numbers associated with the arrangement destination identifiers;
generating first numbers by using the sequence information, the first numbers not having a correlation therebetween when the first numbers are generated with different sequence information;
generating a new first number repeatedly until the first number matches the second number contained in the corresponding information;
determining, when the first number matches any of the second numbers, to arrange the object to an arrangement destination corresponding to the arrangement destination identifier related to the matched second number, wherein, by using a plurality of number creating units, which generate the first numbers, having mutually different ranges of the numbers generable as the first numbers therebetween and having a relation that the range of numbers according to one of the number creating unit with a range number n (n: a natural number) is included in a range of numbers according to other of the number creating unit with a range number (n+1), and wherein (I) a biggest range number is set to p and set a range number big next to q, (II) the first number and the second number are compared when the first number that the number creating unit with the range number p generated exceeds the range according to the number creating unit with the range number q, an arrangement destination corresponding to the arrangement destination identifier related to the second number is determined as an arrangement destination of the object when those numbers are identical and, when those numbers are not identical, generating of the new first number, the (I) and (II) are repeated, and (III) when the first number that the number creating unit with range number p generated is within the range by the number creating unit with the range number q, one is subtracted from p and q, respectively, and as a result of the subtraction, the (II) is repeated when q is not 0, and the first number that the number creating unit with the range number 1 generated is compared with the second number when q is 0, and the arrangement destination corresponding to the arrangement destination corresponding to the arrangement destination identifier related to the second number is determined as an arrangement destination of the object when those numbers are identical, and not identical, the first number is generated and the processing is redone from the (I).

* * * * *